(12) United States Patent
Shimmo et al.

(10) Patent No.: US 9,201,181 B2
(45) Date of Patent: Dec. 1, 2015

(54) INFRARED CUT FILTER AND IMAGING APPARATUS

(71) Applicant: Nippon Sheet Glass Company, Limited, Minato-ku, Tokyo (JP)

(72) Inventors: Katsuhide Shimmo, Minato-ku (JP); Lei Cai, Minato-ku (JP); Yoshihiro Takayanagi, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 22 days.

(21) Appl. No.: 13/973,240

(22) Filed: Aug. 22, 2013

(65) Prior Publication Data

US 2014/0063597 A1    Mar. 6, 2014

(30) Foreign Application Priority Data

Sep. 6, 2012  (JP) ................................. 2012-195937

(51) Int. Cl.
*G02B 5/20* (2006.01)

(52) U.S. Cl.
CPC ..................................... *G02B 5/208* (2013.01)

(58) Field of Classification Search
CPC ......... G02B 5/208; G02B 5/282; G02B 5/223
USPC ......... 359/350, 355, 356, 359–361, 885, 888, 359/890, 892, 839; 396/275
See application file for complete search history.

(56) References Cited

U.S. PATENT DOCUMENTS

| | | | | |
|---|---|---|---|---|
| 6,104,530 A | * | 8/2000 | Okamura et al. | 359/359 |
| 6,107,360 A | * | 8/2000 | Kaneko et al. | 522/81 |
| 2004/0114114 A1 | * | 6/2004 | Yano et al. | 353/84 |
| 2013/0094075 A1 | * | 4/2013 | Saitoh et al. | 359/350 |

FOREIGN PATENT DOCUMENTS

JP         2005-338395 A      12/2005
WO    WO 2011158635 A1 *  12/2011

* cited by examiner

*Primary Examiner* — Scott J Sugarman
*Assistant Examiner* — Wen Huang
(74) *Attorney, Agent, or Firm* — Sughrue Mion, PLLC

(57) ABSTRACT

An infrared cut filter includes: a transparent dielectric substrate; an infrared reflecting layer formed on one surface of the transparent dielectric substrate and configured to reflect infrared light; and an infrared absorbing layer formed on the other surface of the transparent dielectric substrate and configured to absorb infrared light. The infrared absorbing layer is formed of a resin that contains infrared absorbing pigment. The infrared reflecting layer is formed of a dielectric multilayer film.

15 Claims, 34 Drawing Sheets

FIG.5

| | PIGMENT | SUPPLIER | ATTRIBUTE | AMOUNT OF POWDER ADDED[g] | SOLVENT | AMOUNT OF SOLVENT ADDED[g] | AMOUNT OF POWDER ADDED[g] |
|---|---|---|---|---|---|---|---|
| FIRST EXEMPLARY EMBODIMENT | CY-10 | NIPPON KAYAKU CO., LTD. | CYANINE COMPOUND | 0.002 | MEK | 0.807 | 0.0545 |
| | NIA-7200H | HAKKOL CHEMICAL COMPANY, LTD. | AZO COMPOUND | 0.001 | | | |
| | IRG-022 | NIPPON KAYAKU CO., LTD. | DIIMONIUM COMPOUND | 0.003 | | | |
| SECOND EXEMPLARY EMBODIMENT | SEPc-6 | YAMADA CHEMICAL CO., LTD. | PHTHALOCYANINE COPPER COMPLEX | 0.002 | MEK | 0.807 | 0.054 |
| | CY40MC | NIPPON KAYAKU CO., LTD. | CYANINE COMPOUND | 0.004 | | | |
| | CIR-RL | JAPAN CARLIT CO., LTD. | DIIMONIUM COMPOUND | 0.003 | | | |
| THIRD EXEMPLARY EMBODIMENT | SEPc-6 | YAMADA CHEMICAL CO., LTD. | PHTHALOCYANINE COPPER COMPLEX | 0.004 | MEK | 0.807 | 0.0553 |
| | YND-038 | YAMAMOTO CHEMICALS INC. | HETEROAROMATIC COMPOUND | 0.002 | | | |
| | IRG-022 | NIPPON KAYAKU CO., LTD. | DIIMONIUM COMPOUND | 0.003 | | | |

FIG.9

FIRST EXEMPLARY EMBODIMENT

| $\lambda_{AT50\%} - \lambda_{RT50\%}$ [nm] | 60 | 50 | 40 | 30 | 20 | 10 | 0 | -10 | -20 | -30 | -40 | -50 | -60 |
|---|---|---|---|---|---|---|---|---|---|---|---|---|---|
| $T_{ave}$[%]($\lambda$=400-600nm) | 74.18 | 76.07 | 76.28 | 76.32 | 76.38 | 76.33 | 76.23 | 76.25 | 76.14 | 76.23 | 72.90 | 76.14 | 76.05 |
| $\lambda_{T2\%}$[nm] | 620.5 | 629.8 | 639.3 | 648.5 | 657.7 | 666.6 | 675.3 | 683.8 | 692.3 | 701.0 | 710.1 | 718.5 | 728.6 |
| $\lambda_{T5\%}$[nm] | 613.6 | 623.1 | 632.5 | 641.8 | 651.0 | 660.0 | 668.7 | 676.9 | 684.8 | 692.8 | 701.2 | 710.2 | 719.6 |
| $\lambda_{T50\%}$[nm] | 592.1 | 601.7 | 611.1 | 620.4 | 628.2 | 638.1 | 645.7 | 647.4 | 646.1 | 647.9 | 648.9 | 649.4 | 649.3 |
| $\lambda_{SLOPE}=|\lambda_{T50\%}-\lambda_{T2\%}|$ [nm] | 28.4 | 28.2 | 28.1 | 28.1 | 29.4 | 28.5 | 29.7 | 36.4 | 46.2 | 53.1 | 61.2 | 69.1 | 79.3 |
| $\Delta\lambda_{T50\%}$[nm] | 30.6 | 30.5 | 30.3 | 30.1 | 29.8 | 29.5 | 28.4 | 22 | 13.2 | 8.1 | 3.5 | 2.1 | 1.3 |

FIG.10

SECOND EXEMPLARY EMBODIMENT

| | 60 | 50 | 40 | 30 | 20 | 10 | 0 | -10 | -20 | -30 | -40 | -50 | -60 |
|---|---|---|---|---|---|---|---|---|---|---|---|---|---|
| $\lambda_{AT50\%} - \lambda_{RT50\%}$ [nm] | 72.41 | 75.26 | 76.45 | 76.49 | 76.54 | 76.58 | 76.50 | 76.52 | 76.43 | 76.36 | 76.43 | 76.35 | 76.23 |
| $T_{ave}$ [%] ($\lambda$=400-600nm) | 615.4 | 624.8 | 633.8 | 642.7 | 651.8 | 661.3 | 670.7 | 679.8 | 688.9 | 697.6 | 705.5 | 712.4 | 719.5 |
| $\lambda_{T2\%}$ [nm] | 608.3 | 617.9 | 627.3 | 636.3 | 645.1 | 654.3 | 663.7 | 672.9 | 681.7 | 690.3 | 698.5 | 705.7 | 712.5 |
| $\lambda_{T5\%}$ [nm] | 586.9 | 598.6 | 606.1 | 615.6 | 624.8 | 633.5 | 640.7 | 643.1 | 642.7 | 643.1 | 644.2 | 644.5 | 644.4 |
| $\lambda_{T50\%}$ [nm] | 28.4 | 26.2 | 27.7 | 27.1 | 27.0 | 27.9 | 30.0 | 36.7 | 46.1 | 54.4 | 61.3 | 68.0 | 75.1 |
| $\lambda_{SLOPE} = |\lambda_{T50\%} - \lambda_{T2\%}|$ [nm] | 30.1 | 29.9 | 29.8 | 29.8 | 29.7 | 29.1 | 27.2 | 20.9 | 12.7 | 6.8 | 3.1 | 1.2 | 1.2 |
| $\Delta\lambda_{T50\%}$ [nm] | | | | | | | | | | | | | |

FIG.11

THIRD EXEMPLARY EMBODIMENT

| $\lambda_{AT50\%} - \lambda_{RT50\%}$ [nm] | 60 | 50 | 40 | 30 | 20 | 10 | 0 | -10 | -20 | -30 | -40 | -50 | -60 |
|---|---|---|---|---|---|---|---|---|---|---|---|---|---|
| $T_{ave}$[%]($\lambda$=400-600nm) | 67.83 | 71.48 | 74.49 | 76.36 | 76.57 | 76.61 | 76.67 | 76.61 | 76.51 | 76.54 | 74.10 | 76.55 | 76.51 |
| $\lambda_{T2\%}$[nm] | 601.2 | 610.5 | 619.8 | 628.9 | 637.3 | 645.6 | 654.8 | 664.3 | 673.8 | 683.2 | 692.6 | 701.1 | 707.9 |
| $\lambda_{T5\%}$[nm] | 594.2 | 603.7 | 613.1 | 622.4 | 631.3 | 639.3 | 647.3 | 656.3 | 665.7 | 674.9 | 683.9 | 693.2 | 701.3 |
| $\lambda_{T50\%}$[nm] | 573.1 | 582.7 | 592.1 | 601.3 | 610.5 | 619.3 | 627.3 | 630.6 | 630.5 | 630.3 | 631.4 | 631.5 | 631.5 |
| $\lambda_{SLOPE}=|\lambda_{T50\%}-\lambda_{T2\%}|$ [nm] | 28.0 | 27.8 | 27.7 | 27.6 | 26.8 | 26.3 | 27.5 | 33.7 | 43.3 | 52.8 | 61.2 | 69.6 | 76.4 |
| $\Delta\lambda_{T50\%}$[nm] | 30.3 | 30.0 | 29.6 | 29.2 | 29.0 | 28.9 | 28.2 | 23.0 | 15.0 | 7.9 | 3.3 | 0.9 | 1.0 |

1

INFRARED CUT FILTER AND IMAGING APPARATUS

BACKGROUND OF THE INVENTION

1. Field of the Invention

The present invention relates to an infrared cut filter and an imaging apparatus in which an infrared cut filter is used.

2. Description of the Related Art

A semiconductor solid-state imaging device such as a charge coupled device (CCD) or a complementary metal oxide semiconductor (CMOS) is built in imaging apparatus such as digital cameras. The sensitivity of these solid-state imaging devices extends from a visible spectrum range to an infrared spectrum range. For this reason, an infrared cut filter for shielding infrared light is provided between an imaging lens system and a solid-state imaging device in the imaging apparatus. The infrared cut filter enables calibrating the sensitivity of the solid-state imaging device to approximate the spectral sensitivity of human beings.

Infrared cut filters used in the related art include those manufactured by forming an infrared reflecting layer including a dielectric multilayer film on a resin substrate (see, for example, patent document 1).

[patent document 1] JP2005-338395

However, an infrared reflecting layer including a dielectric multilayer has incident angle dependence in which infrared shielding property vary depending on the incident angle. Therefore, the central part of an image capturing light transmitted through the infrared reflecting layer may look different in color from the periphery thereof.

SUMMARY OF THE INVENTION

The present invention addresses the issue and a purpose thereof is to provide an infrared cut filter having favorable infrared shielding property relatively less dependent on the incident angle, and to provide an imaging apparatus in which the infrared cut filter is used.

The infrared cut filter according to at least one embodiment comprises: a transparent dielectric substrate; an infrared reflecting layer formed on one surface of the transparent dielectric substrate and configured to reflect infrared light; and an infrared absorbing layer formed on the other surface of the transparent dielectric substrate and configured to absorb infrared light.

The infrared absorbing layer may be formed of a resin that contains infrared absorbing pigment.

The infrared reflecting layer may be formed of a dielectric multilayer film.

Given that the wavelength that provides the transmittance of 50% of the infrared reflecting layer is $\lambda_{RT50\%}$ nm and the wavelength that provides the transmittance of 50% of the infrared absorbing layer is $\lambda_{AT50\%}$ nm, the infrared reflecting layer and the infrared absorbing layer may be formed such that $\lambda_{AT50\%} < \lambda_{RT50\%}$ is met.

Further, the infrared reflecting layer and the infrared absorbing layer may be formed such that $\lambda_{AT50\%} - \lambda_{RT50\%} \leq -10$ nm is met.

Further, the infrared reflecting layer and the infrared absorbing layer may be formed such that $-50$ nm $\leq \lambda_{AT50\%} - \lambda_{RT50\%}$ is met.

The transparent dielectric substrate may be formed of glass. The infrared reflecting layer may be formed so as to reflect ultraviolet light. A protective layer may be provided on the infrared absorbing layer. The protective layer may have the function of preventing reflection of visible light. The protective layer may have the function of preventing transmittance of ultraviolet light. A reflection prevention layer for preventing reflection of visible light may be provided on the protective layer. The reflection prevention layer may have the function of preventing transmittance of ultraviolet light. A primer layer may be provided between the transparent dielectric substrate and the infrared absorbing layer.

The infrared reflecting layer may be warped such that the surface opposite to the surface on the side of the transparent dielectric substrate is convex.

Another embodiment of the present invention relates to an imaging apparatus. The imaging apparatus comprises: the infrared cut filter as described above; and an imaging device on which light transmitted through the infrared cut filter is incident.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 lists the composition of the infrared absorbing layer used in the first through third exemplary embodiments;

FIG. 9 lists primary parameters of the spectral transmittance curves shown in FIGS. 6A-6M;

FIG. 10 lists primary parameters of the spectral transmittance curves shown in FIGS. 7A-7M;

FIG. 11 lists primary parameters of the spectral transmittance curves shown in FIGS. 8A-8M;

DETAILED DESCRIPTION OF THE INVENTION

The invention will now be described by reference to the preferred embodiments. This does not intend to limit the scope of the present invention, but to exemplify the invention.

Figure 1:
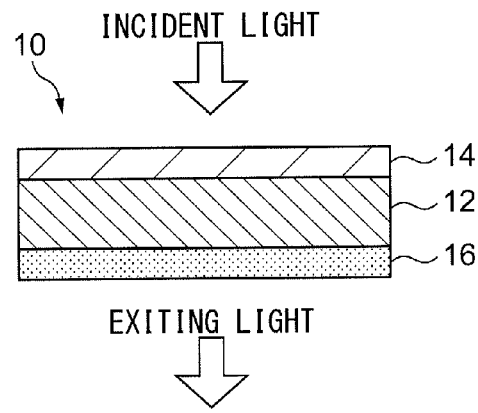
FIG. 1 is a cross sectional view showing the structure of the infrared cut filter according to the embodiment of the present invention.

FIG. 1 is a cross sectional view showing the structure of an infrared cut filter 10 according to an embodiment of the present invention. As shown in FIG. 1, the infrared cut filter 10 includes a transparent dielectric substrate 12, an infrared reflecting layer 14, and an infrared absorbing layer 16. The infrared reflecting layer 14 is formed on one of the surfaces of the transparent dielectric substrate 12. The infrared absorbing layer 16 is formed on the other surface of the transparent dielectric substrate 12.

For example, the infrared cut filter 10 shown in FIG. 1 is provided between the imaging lens system and the imaging device of a digital camera. The infrared cut filter 10 is implemented to receive light via the infrared reflecting layer 14 and emit light from the infrared absorbing layer 16. In other words, the infrared reflecting layer 14 as implemented in the camera faces the imaging lens system and the infrared absorbing layer 16 faces the imaging device.

The transparent dielectric substrate 12 may be a plate of a thickness of about 0.1 mm-0.3 mm. The material forming the transparent dielectric substrate 12 is non-limiting so long as it transmits visible light. For example, the transparent dielectric substrate 12 may be formed of glass. A glass substrate formed of glass is inexpensive and so is favorable in terms of cost. Alternative, a synthetic resin film or a synthetic resin substrate formed of polymethylmethacrylate (PMMA), polyethylene terephthalate (PET), polycarbonate (PC), polyimide (PI), etc. may be used as the transparent dielectric substrate 12.

The infrared reflecting layer 14 is formed on one of the surfaces of the transparent dielectric substrate 12 as described above and functions as a surface on which light is incident. The infrared reflecting layer 14 is configured to transmit visible light and reflect infrared light. The infrared reflecting layer 14 may be formed of a dielectric multilayer film including a stack of a large number of dielectric layers with different refractive indices. The optical property of the dielectric multilayer film such as spectral transmittance property can be designed at will by controlling the refractive index and thickness of each layer. The infrared reflecting layer 14 may be formed by alternately depositing a titanium oxide ($TiO_2$) layer and a silicon oxide ($SiO_2$) layer with different refractive indices on the transparent dielectric substrate 12. Other than $TiO_2$ and $SiO_2$, a dielectric material such as $MgF_2$, $Al_2O_3$, $MgO$, $ZrO_2$, $Nb_2O_5$, and $Ta_2O_5$ may be used to form the dielectric multilayer film.

The infrared absorbing layer 16 is formed on the other surface of the transparent dielectric substrate 12 as described above and functions as a surface from which light exits. The infrared absorbing layer 16 is configured to transmit visible light and absorb infrared light. The light incident on the infrared cut filter 10 is transmitted through the infrared reflecting layer 14 and the transparent dielectric substrate 12 before being incident on the infrared absorbing layer 16. Therefore, the infrared absorbing layer 16 absorbs infrared light not shielded by the infrared reflecting layer 14 or the transparent dielectric substrate 12.

The infrared absorbing layer 16 may be formed by depositing resin containing infrared absorbing pigment on the transparent dielectric substrate 12. The infrared absorbing layer 16 may be a solid film formed by adding appropriate infrared absorbing pigment in a resin matrix, dissolving or dispersing the pigment, and drying and curing the matrix. Azo compound, diimonium compound, dithiol metal complex, phthalocyanine compound, cyanine compound, etc. may be used as the infrared absorbing pigment. Alternatively, these compounds may be used in combination thereof. The resin matrix is required to retain the infrared absorbing pigment dissolved or dispersed in the matrix and to be a transparent dielectric material. Polyester, polyacryl, polyolefin, polycarbonate, polycycloolefin, polyvinyl butyral, etc. may be used as the resin matrix. These materials for resin matrix are inexpensive and so are favorable in terms of cost.

A description will now be given of the function of the infrared cut filter 10 according to the embodiment. A description will first be given of the function of the infrared cut filter according comparative embodiments.

Figure 2:
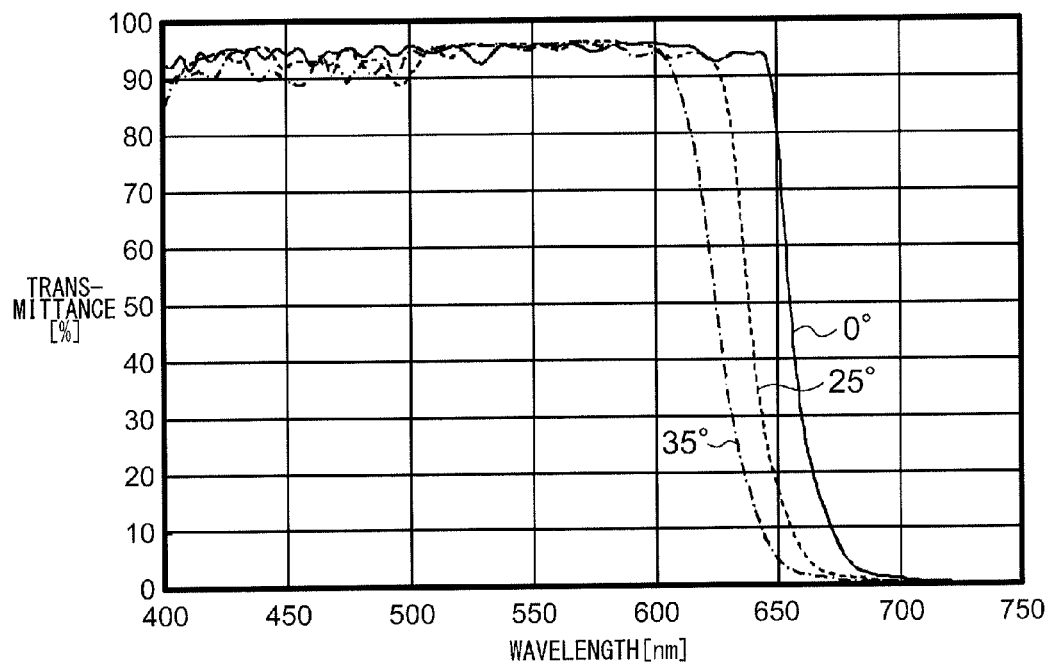
FIG. 2 shows an exemplary spectral transmittance curve of an infrared reflecting layer according to the first exemplary embodiment including a dielectric multilayer film.
Figure 3:
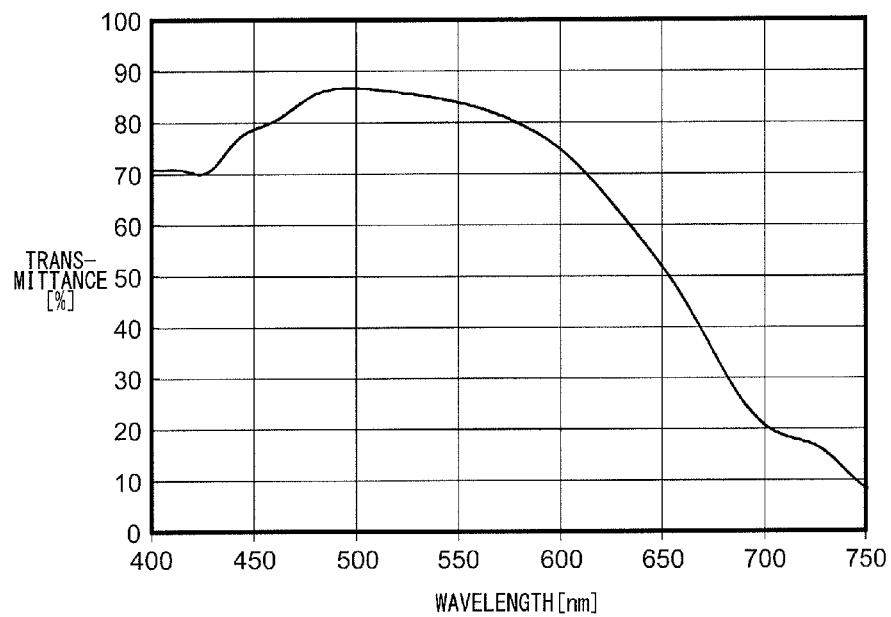
FIG. 3 shows an exemplary spectral transmittance curve of an infrared absorbing layer according to the second exemplary embodiment.

FIG. 2 shows the spectral transmittance curve of an infrared cut filter according to the first comparative embodiment in which only an infrared reflecting layer including a dielectric multilayer film is formed on a glass substrate. FIG. 3 shows the spectral transmittance curve of an infrared cut filter according to the second comparative example in which only an infrared absorbing layer including a resin matrix that contains infrared absorbing pigment is formed on a glass substrate.

As shown in FIG. 2, the infrared cut filter according to the first comparative example exhibits dependence on the incident angle, which is characteristic to a dielectric multilayer film. The solid line in FIG. 2 represents the spectral transmittance curve that results when the incident angle is 0°, the broken line represents the spectral transmittance curve that results when the incident angle is 25°, and the chain line represents the spectral transmittance curve that results when the incident angle is 35°. Given that the wavelength that provides the transmittance of 50% is $\lambda_{RT50\%}$, $\lambda_{RT50\%}$=about 655 nm when the incident angle is 0°. When the incident angle is 25°, $\lambda_{RT50\%}$=about 637 nm, and, when the incident angle is 35°, $\lambda_{RT50\%}$=about 625 nm. Thus, when the incident angle changes from 0° to 35° in the infrared cut filter according to the first comparative example, $\lambda_{RT50\%}$ is shifted to the short wavelength side by about 30 nm.

Provided that the infrared cut filter is used with an imaging device, light with a small incident angle (e.g. the incident angle of 0°) on the infrared cut filter enters the central part of the imaging device. Meanwhile, light with a large incident angle (e.g. the incident angle of 25° or 35°) on the infrared cut filter enters the periphery of the imaging device. Therefore, if the infrared cut filter having the infrared shielding property shown in FIG. 2 is used in an imaging apparatus, the spectral transmittance property (in particular, the spectral property near the wavelength 650 nm) of light entering the imaging device will differ depending on the position on the light-receiving surface of the imaging device. This results in different colors in the central part of an image and in the periphery thereof, thereby adversely affecting color reproducibility.

Unlike the infrared cut filter according to the first comparative example, the shielding property of the infrared cut filter according to the second comparative example is not dependent on the incident angle. However, the spectral transmittance curve of the infrared cut filter according to the second comparative example shows gradual decrease in a transient range where the transmittance changes from relatively high to relatively low. Generally, an infrared cut filter is designed to have a transient range near the wavelength of 600 nm to 700 nm so as not to affect color reproducibility. An infrared cut filter is expected show an abrupt change in the transmittance in this range. Such a property is referred to as "sharp cut-off property". Therefore, it is impossible to control color reproducibility properly by using the infrared cut filter according to the second comparative example.

We considered the disadvantage associated with the comparative examples and found out that reduction in the dependence of the shielding property on the incident angle and favorable sharp cut-off property can be realized by forming the infrared reflecting layer 14 on one surface of the transparent dielectric substrate 12 and forming the infrared absorbing layer 16 on the other surface.

Figure 4:
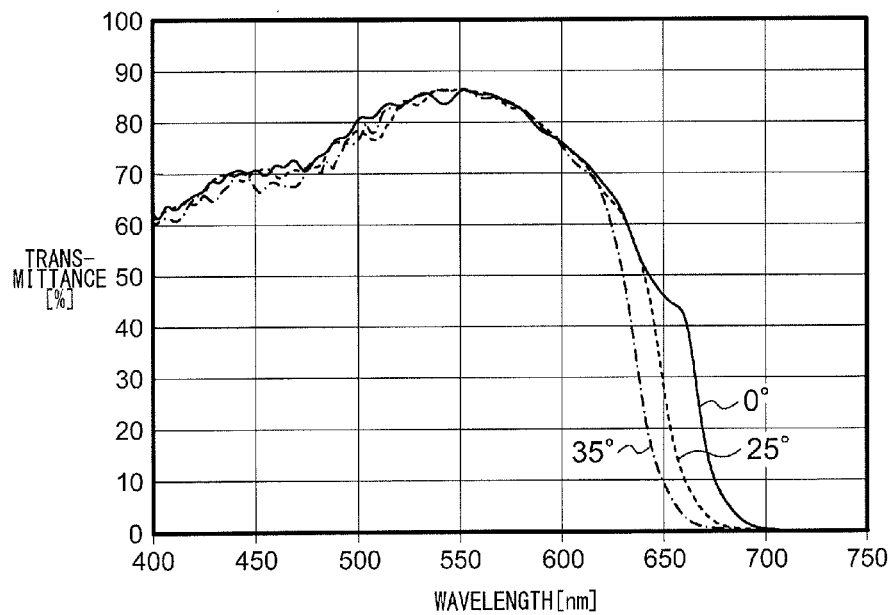
FIG. 4 shows an exemplary spectral transmittance curve of the infrared cut filter according to the embodiment.

FIG. 4 shows the spectral transmittance curve of the infrared cut filter 10 according to the embodiment. In FIG. 4 as in FIG. 2, the solid line represents the spectral transmittance curve that results when the incident angle is 0°, the broken line represents the spectral transmittance curve that results when the incident angle is 25°, and the chain line represents the spectral transmittance curve that results when the incident angle is 35°.

The property of the infrared cut filter 10 according to the embodiment is determined by the combination of the optical property of the infrared reflecting layer 14 and the optical property of the infrared absorbing layer 16. It will be given that the wavelength that provides the transmittance of 50% of the infrared reflecting layer alone, when the incident angle is 0°, is $\lambda_{RT50\%}$ (nm), and the wavelength that provides the transmittance of 50% of the infrared absorbing layer alone is $\lambda_{AT50\%}$ (nm). FIG. 4 shows the spectral transmittance curve of the infrared cut filter 10 in which $\lambda_{AT50\%} = \lambda_{RT50\%} - 20$ nm, namely, in which $\lambda_{AT50\%}$ is shorter than $\lambda_{RT50\%}$ by 20 nm.

Given that the wavelength that provides the transmittance of 50% of the infrared cut filter 10 according to the embodiment, when the incident angle is 0°, is $\lambda_{T50\%}$ (nm), $\lambda_{T50\%}$ of the infrared cut filter 10 according to the embodiment is approximately equal to 646 nm when the incident angle is 0°, as shown in FIG. 4. When the incident angle is 25°, $\lambda_{T50\%}$ is approximately equal to 645 nm. When the incident angle is 35°, $\lambda_{T50\%}$ is approximately equal to 633 nm. Thus, $\lambda_{T50\%}$ of the infrared cut filter 10 according to the embodiment is shifted to the short wavelength side by only about 13 nm even when the incident angle changes from 0° to 35°. The dependence of $\lambda_{T50\%}$ on the incident angle is smaller than the dependence of $\lambda_{RT50\%}$ on the incident angle of the first comparative example. Referring also to FIG. 4, change in the incident angle hardly produces any change in the spectral transmittance curve in the range in which the transmittance is higher than 50%. Meanwhile, in the range in which the transmittance is lower than 50%, the spectral transmittance curve shows a difference in response to a change in the incident angle. However, the difference in the spectral transmittance curve in the range in which the transmittance is lower than 50% hardly presents any problem because the impact on color reproducibility is small.

Further, FIG. 4 shows that the infrared cut filter 10 according to the embodiment has a transient range near the wavelength of 600 nm to 700 nm. The transmittance changes abruptly in this range with the result that a favorable sharp cut-off property is realized.

The optical property of the infrared cut filter 10 according to the embodiment is determined by the combination of the infrared reflecting layer 14 and the infrared absorbing layer 16. The favorable optical property of the infrared reflecting layer 14 and the infrared absorbing layer 16 will now be discussed.

First, the suitable optical property of the infrared reflecting layer 14 will be discussed. The infrared reflecting layer 14 is designed to pass visible light at least in a band of 400 nm-600 nm and at least reflect infrared light with a wavelength longer than 750 nm so as to achieve the required performance. The wavelength that provides the spectral transmittance of 50% in a transient range between the pass range and the reflection range will be defined as a cut-off wavelength $\lambda_{RT50\%}$. $\lambda_{RT50\%}$ of the infrared reflecting layer 14 depends on the requirement from the spectral sensitivity area of the imaging device and is preferably designed to be near the cut-off wavelength $\lambda_{AT50\%}$ of the infrared absorbing layer 16. More preferably, $\lambda_{RT50\%}$ is designed such that $\lambda_{AT50\%} < \lambda_{RT50\%}$.

The infrared reflecting layer 14 is designed so that the transmittance in the visible spectrum range is as high as possible. This is to allow light in the visible spectrum range necessary for imaging to reach the light-receiving surface of the imaging device as much as possible. Meanwhile, the infrared reflecting layer 14 is designed so that the transmittance in the infrared spectrum range is as low as possible. This is to shield light not contributing to imaging or light in a harmful range as much as possible. For example, the infrared reflecting layer 14 preferably has an average spectral transmittance of 90% or greater at least in a visible spectrum range in the wavelength band of 400 nm-600 nm and a spectral transmittance of less than 2% at least in an infrared spectrum range beyond the wavelength of 750 nm.

Further, the spectral transmittance of the infrared reflecting layer 14 preferably exhibits abrupt change in the transient range (referred to as "sharp cut-off property"). This is because, if the sharp cut-off property is lost and the transient range grows excessively, it will be difficult to control color reproducibility. Defining the steepness of the transmittance in the transient range as $\lambda_{RSLOPE} = |\lambda_{RT50\%} - \lambda_{RT2\%}|$ ($\lambda_{RT2\%}$ denotes the wavelength that provides the spectral transmittance of 2%), $\lambda_{RSLOPE}$ of the infrared reflecting layer 14 is preferably as small as possible. For example, $\lambda_{RSLOPE}$ is preferably less than 70 nm.

The spectral transmittance curve shown in FIG. 2 shows that the average spectral transmittance is 90% or greater in the visible spectrum range when the incident angle is 0°, 25°, or 35°. The average spectral transmittance in the infrared spectrum range is less than 2%. The spectral transmittance curve shown in FIG. 2 shows that $\lambda_{RSLOPE}$ is less than 70 nm when the incident angle is 0°, 25°, or 35°. Therefore, the infrared absorbing layer 16 having the spectral transmittance shown in FIG. 2 can be suitably used in the infrared cut filter 10 according to the embodiment.

A description will now be given of the suitable optical property of the infrared absorbing layer 16. The optical property required of the infrared absorbing layer 16 varies depending on the optical property of the infrared reflecting layer 14 with which the infrared absorbing layer 16 is combined.

In this embodiment, it is preferable that the cut-off wavelength $\lambda_{AT50\%}$ of the infrared absorbing layer 16 be shorter than the cut-off wavelength $\lambda_{RT50\%}$ of the infrared reflecting layer 14, i.e., it is preferable that $\lambda_{AT50\%} < \lambda_{RT50\%}$. By ensuring that the infrared absorbing layer 16 meets this condition, the dependence of the infrared shielding property on the incident angle of the infrared cut filter 10, namely, the shift amount of the cut-off wavelength $\lambda_{T50\%}$ of the infrared cut filter 10 occurring when the incident angle changes from 0° to 35° can be reduced.

Further, it is preferable that the average transmittance of the infrared absorbing layer 16 in the visible spectrum range be as high as possible. This is because, if the average transmittance in the range of the infrared absorbing layer 16 is small, the amount of light reaching the imaging device will be small. For example, it is preferable that the average transmittance of the infrared absorbing layer 16 in the wavelength 400 nm-600 nm be 80% or greater.

In this embodiment, the spectral transmittance of the infrared absorbing layer 16 in the long wavelength range beyond $\lambda_{RT2\%}$ is not of concern. This is because the average spectral transmittance of the infrared reflecting layer 14 is extremely small in this range so that the overall transmittance in the range of the infrared cut filter 10 is ensured to be low.

In this embodiment, it is preferable that the spectral transmittance curve of the infrared absorbing layer 16 monotonously decrease in the transient range (e.g. 600 nm-$\lambda_{RT2\%}$). This is because it is easy in this way to know the cut-off wavelength $\lambda_{T50\%}$ of the infrared cut filter 10 comprised of the combination of the layers 14 and 16. Other advantages include easiness and flexibility of setting and easiness of control of color reproducibility.

Discussed below are first through third exemplary embodiments in which are used the infrared reflecting film and the infrared absorbing layer that meet all of the above conditions. Also, a detailed study is made of the relationship between the cut-off wavelength $\lambda_{RT50\%}$ of the infrared reflecting layer 14 and the cut-off wavelength $\lambda_{AT50\%}$ of the infrared absorbing layer 16.

Figure 21:
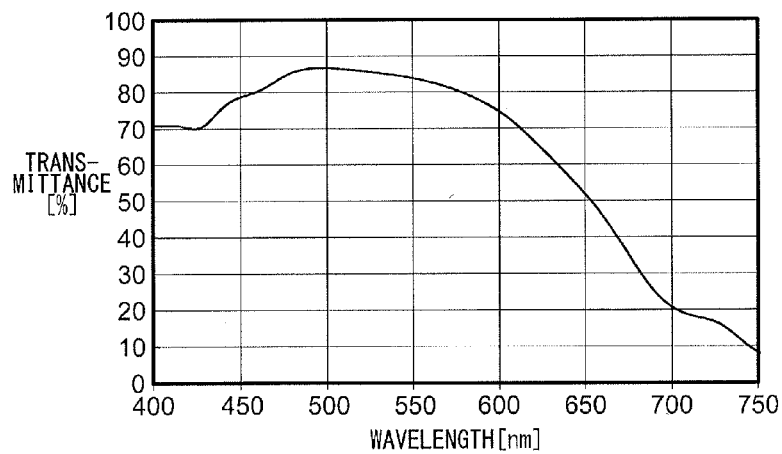
FIG. 21 shows the spectral transmittance curve of the infrared absorbing layer used in the first exemplary embodiment.
Figure 22:
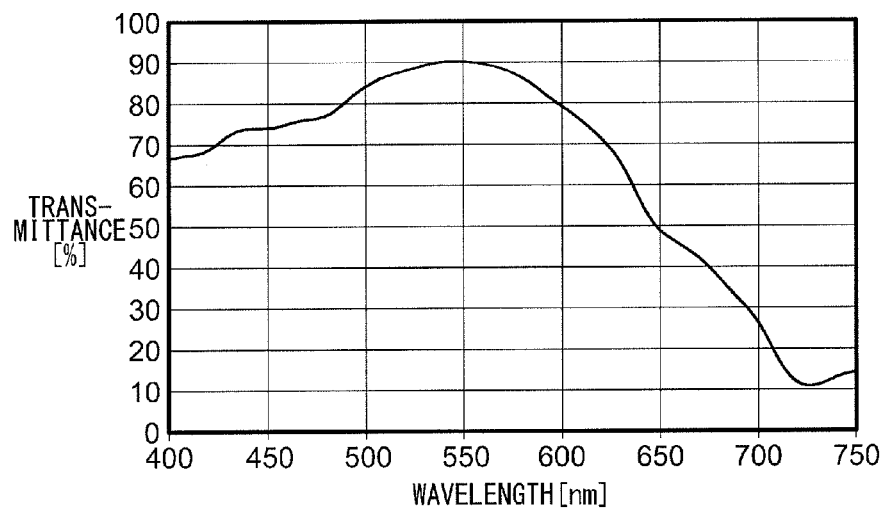
FIG. 22 shows the spectral transmittance curve of the infrared absorbing layer used in the second exemplary embodiment.
Figure 23:
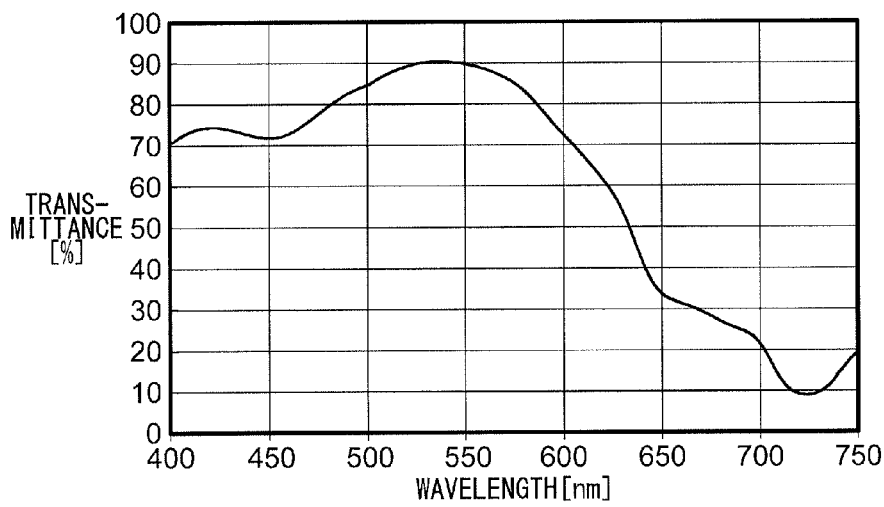
FIG. 23 shows the spectral transmittance curve of the infrared absorbing layer used in the third exemplary embodiment.

FIG. 5 lists the composition of the infrared absorbing layer used in the first through third exemplary embodiments. The infrared absorbing layer used in the first exemplary embodiment is formed in the following steps. First, methyl ethyl ketone (MEK) is used as a solvent. 0.002/0.807=0.25 wt % of KAYASORB CY-10 (cyanine compound) from NIPPON KAYAKU CO., LTD., 0.001/0.807=0.12 wt % of NIA-7200H (azo compound) from HAKKOL CHEMICAL CO., LTD., 0.003/0.807=0.37 wt % of KAYASORB IRG-022 (diimonium compound) from NIPPON KAYAKU CO., LTD. are added to 0.055% PVB (polyvinyl butyral)). After blending, the solution is stirred for 10-15 minutes. The solution is applied evenly on one surface of a glass substrate by flow coating. The glass substrate is left untouched for two hours to dry. The glass substrate is heated for 20 minutes at 140° C. so as to form an infrared absorbing layer. The infrared absorbing layers of the second and third exemplary embodiments are also formed in similar steps, using the pigment shown in FIG. 5. The spectral transmittance curves of the infrared absorbing film in isolation are shown in FIGS. 21, 22, and 23. The average transmittance in the wavelength 400 nm-600 nm in the first through third exemplary embodiments is 80.4%, 80.6%, and 80.7%, respectively. In a long-wavelength range beyond the wavelength 600 nm, the curve monotonously decreases.

Figure 20:
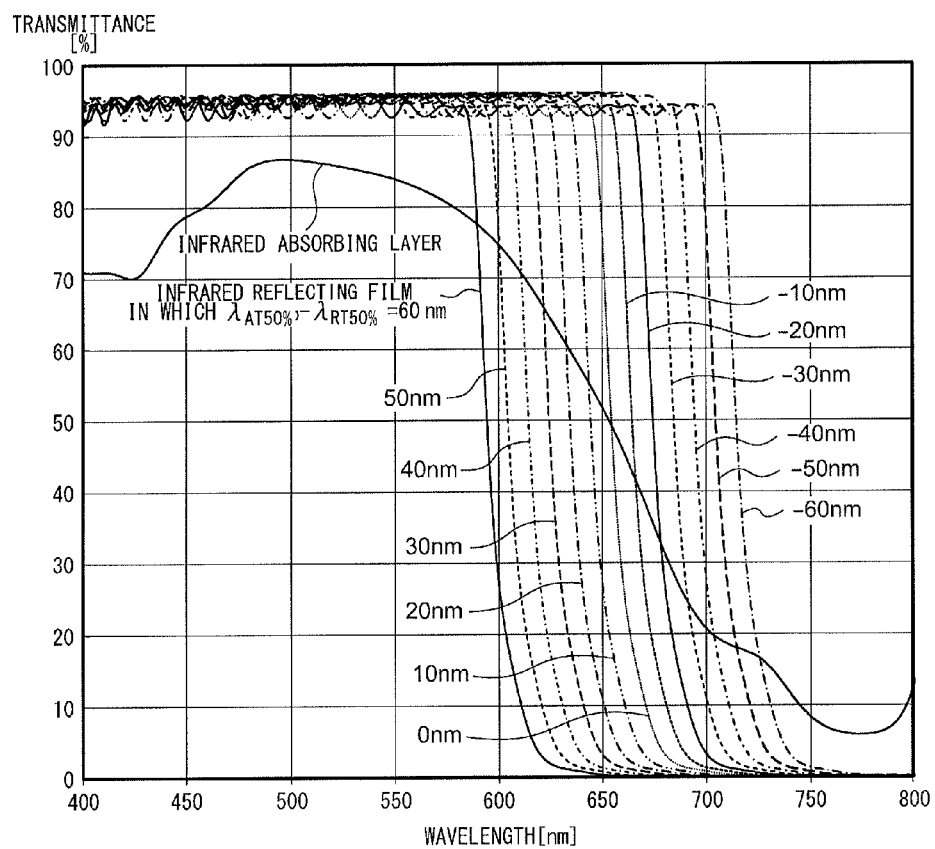
FIG. 20 shows the spectral transmittance curves obtained when the cut-off wavelength of the infrared reflecting layer is varied.

A more suitable condition for the cut-off wavelength $\lambda_{RT50\%}$ of the infrared reflecting layer 14 and the cut-off wavelength $\lambda_{AT50\%}$ of the infrared absorbing layer 16 will be discussed. FIGS. 6A-6M show the spectral transmittance curves of the infrared cut filter obtained by varying the difference between $\lambda_{AT50\%}$ and $\lambda_{RT50\%}$ in the first exemplary embodiment in units of 10 nm. FIGS. 7A-7M show the spectral transmittance curves of the infrared cut filter obtained by varying the difference between $\lambda_{AT50\%}$ and $\lambda_{RT50\%}$ in the second exemplary embodiment in units of 10 nm. FIGS. 8A-8M show the spectral transmittance curves of the infrared cut filter obtained by varying the difference between $\lambda_{AT50\%}$ and $\lambda_{RT50\%}$ in the third exemplary embodiment in units of 10 nm. Referring to FIGS. 6A-6M, 7A-7M, and 8A-8M, the solid line represents the spectral transmittance curve that results when the incident angle is 0°, the broken line represents the spectral transmittance curve that results when the incident angle is 25°, and the chain line represents the spectral transmittance curve that results when the incident angle is 35°. In each of the exemplary embodiments, the difference between $\lambda_{AT50\%}$ and $\lambda_{RT50\%}$ is set by fixing $\lambda_{AT50\%}$ of the infrared absorbing layer 16 and varying the cut-off wavelength $\lambda_{RT50\%}$ of the infrared reflecting layer 14, as shown in FIG. 20. Since the infrared reflecting layer 14 is formed of a dielectric multilayer film, variation in the transient range can be easily implemented by adjusting the film thickness or the number of layers. FIG. 20 shows variation of the spectral transmittance curve of the infrared reflecting layer according to the first exemplary embodiment. The spectral transmittance curve of the infrared reflecting layer according to the second and third exemplary embodiment can be varied similarly.

Figure 6A:
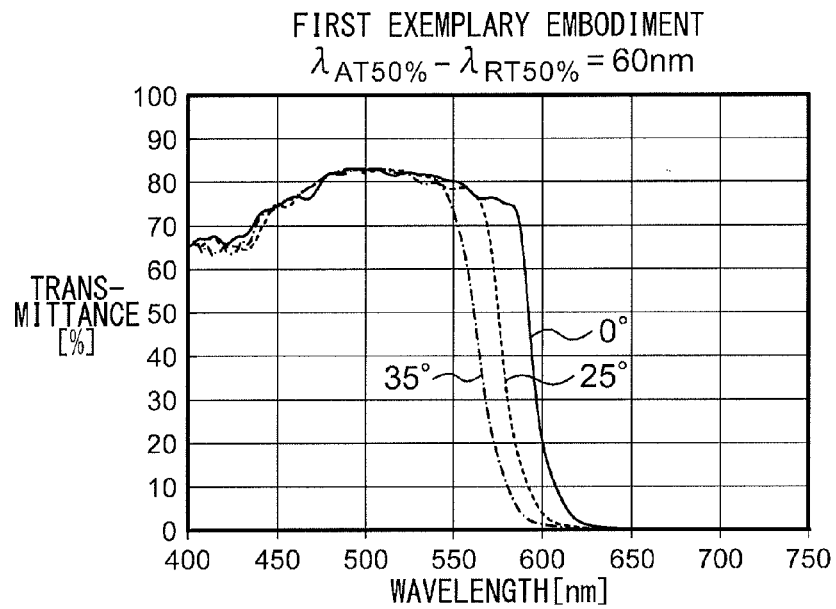
FIG. 6A shows the spectral transmittance of the infrared cut filter according to the first exemplary embodiment in which $\lambda_{AT50\%} - \lambda_{RT50\%} = 60$ nm.
Figure 6B:
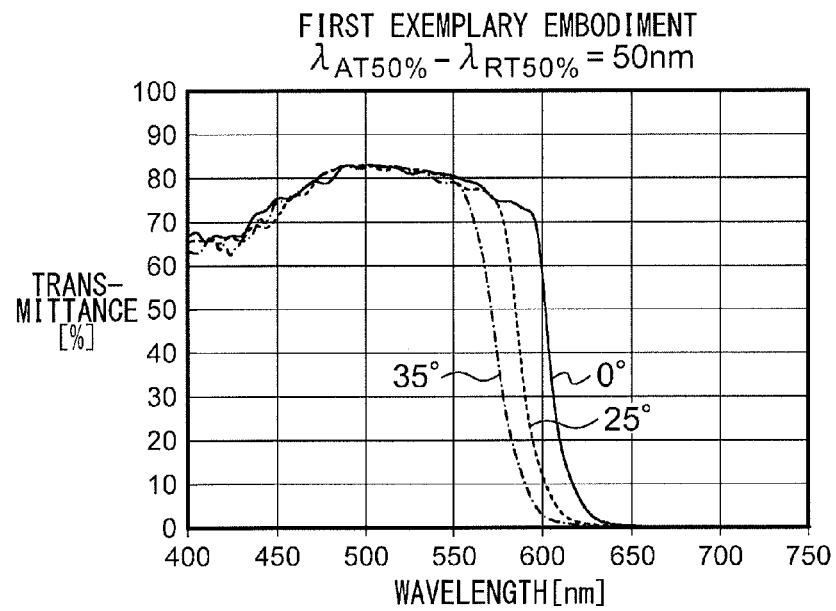
FIG. 6B shows the spectral transmittance of the infrared cut filter according to the first exemplary embodiment in which $\lambda_{AT50\%} - \lambda_{RT50\%} = 50$ nm.
Figure 6C:
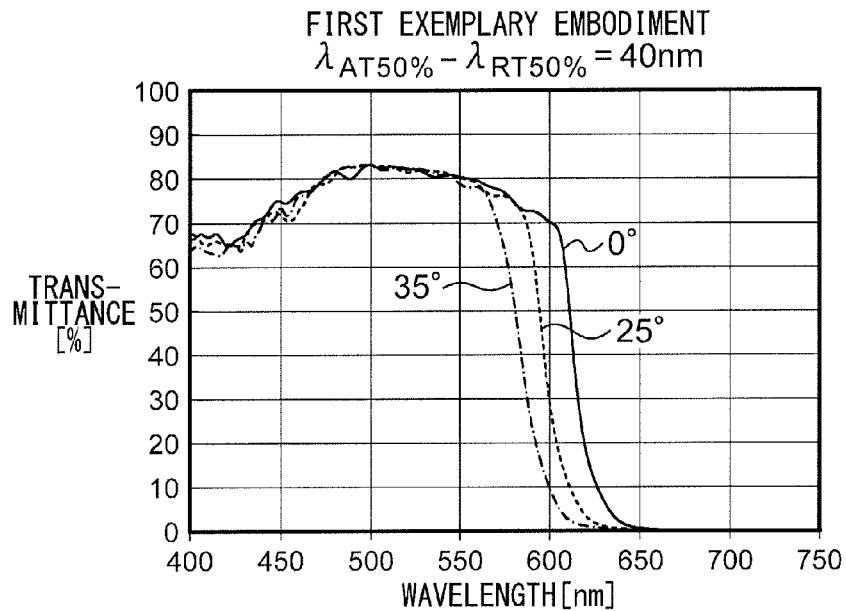
FIG. 6C shows the spectral transmittance of the infrared cut filter according to the first exemplary embodiment in which $\lambda_{AT50\%} - \lambda_{RT50\%} = 40$ nm.
Figure 6D:
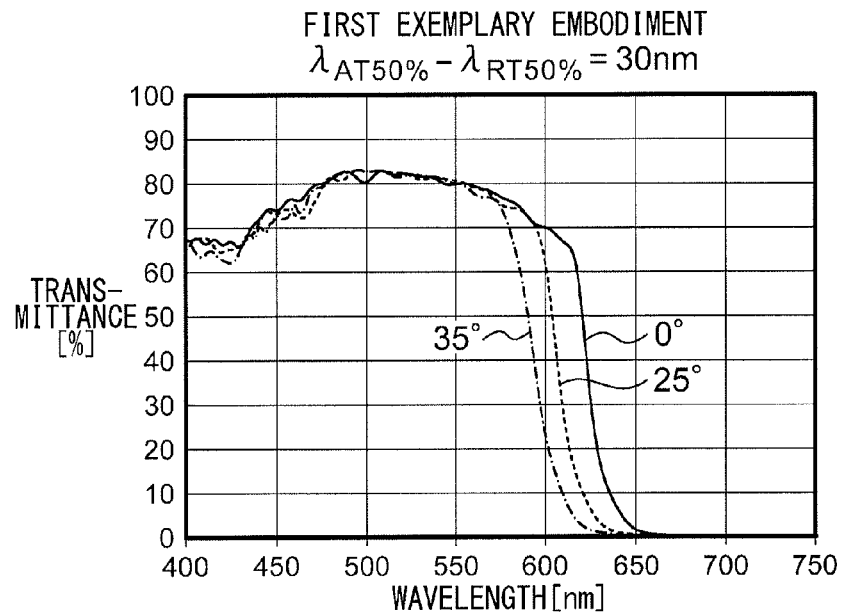
FIG. 6D shows the spectral transmittance of the infrared cut filter according to the first exemplary embodiment in which $\lambda_{AT50\%} - \lambda_{RT50\%} = 30$ nm.
Figure 6E:
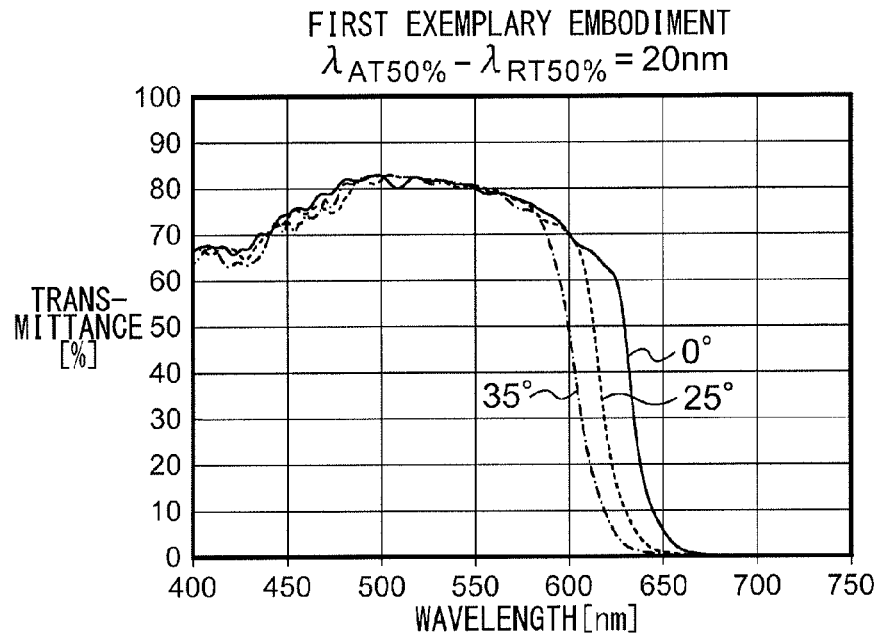
FIG. 6E shows the spectral transmittance of the infrared cut filter according to the first exemplary embodiment in which $\lambda_{AT50\%} - \lambda_{RT50\%} = 20$ nm.
Figure 6F:
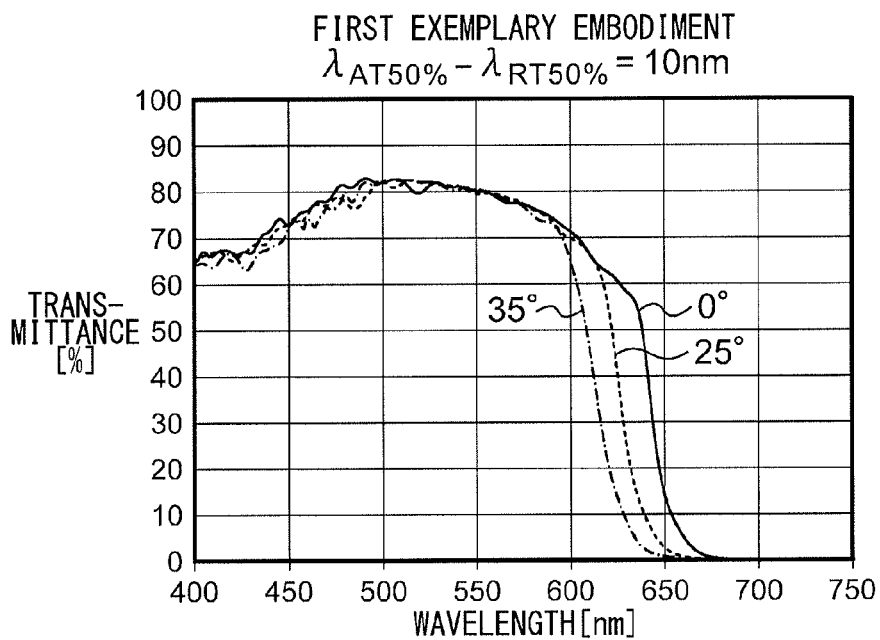
FIG. 6F shows the spectral transmittance of the infrared cut filter according to the first exemplary embodiment in which $\lambda_{AT50\%} - \lambda_{RT50\%} = 10$ nm.
Figure 6G:
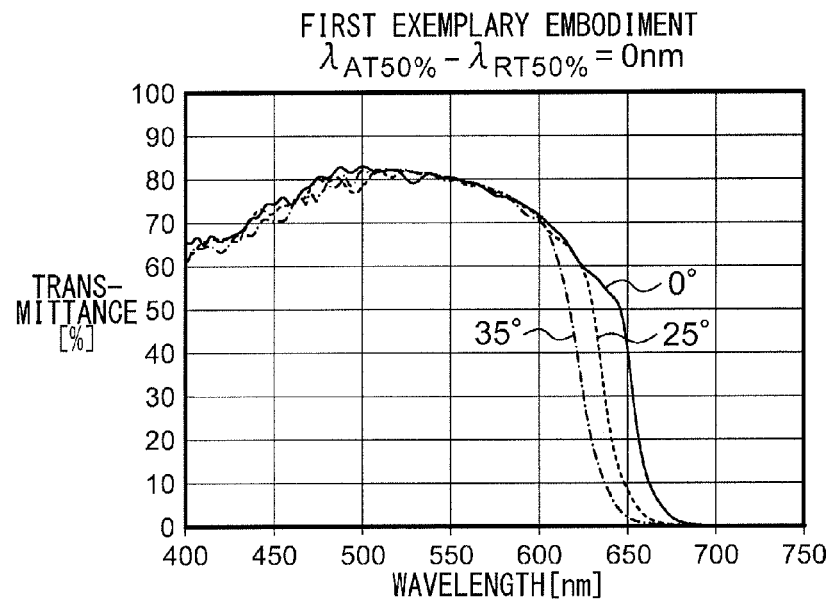
FIG. 6G shows the spectral transmittance of the infrared cut filter according to the first exemplary embodiment in which $\lambda_{AT50\%} - \lambda_{RT50\%} = 0$ nm.
Figure 6H:
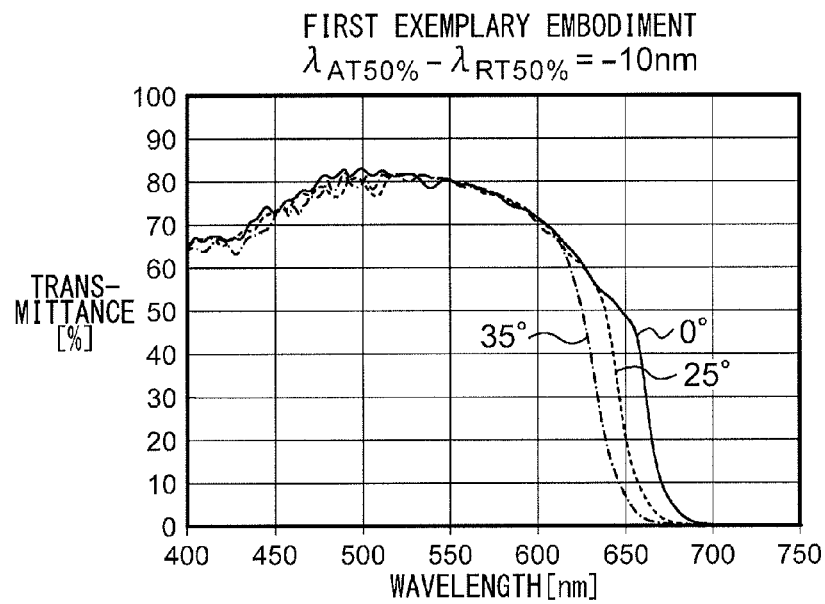
FIG. 6H shows the spectral transmittance of the infrared cut filter according to the first exemplary embodiment in which $\lambda_{AT50\%} - \lambda_{RT50\%} = -10$ nm.
Figure 6I:
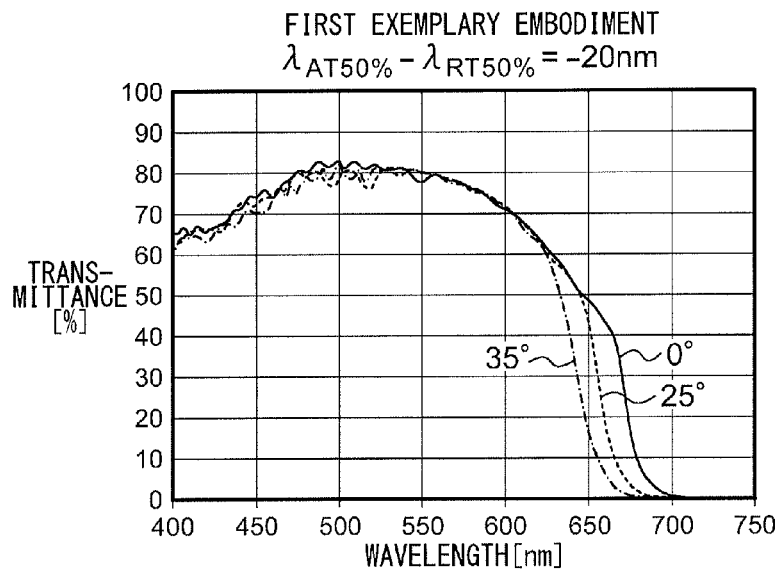
FIG. 6I shows the spectral transmittance of the infrared cut filter according to the first exemplary embodiment in which $\lambda_{AT50\%} - \lambda_{RT50\%} = -20$ nm.
Figure 6J:
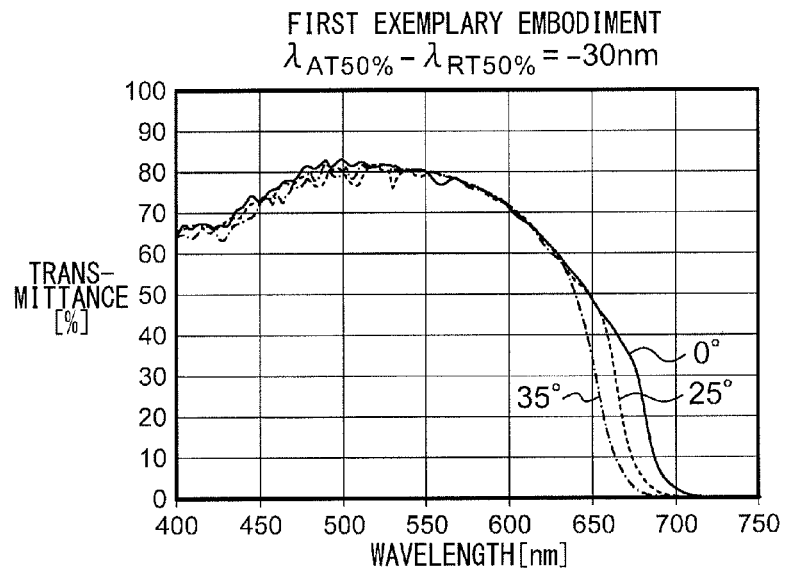
FIG. 6J shows the spectral transmittance of the infrared cut filter according to the first exemplary embodiment in which $\lambda_{AT50\%}-\lambda_{RT50\%}=-30$ nm.
Figure 6K:
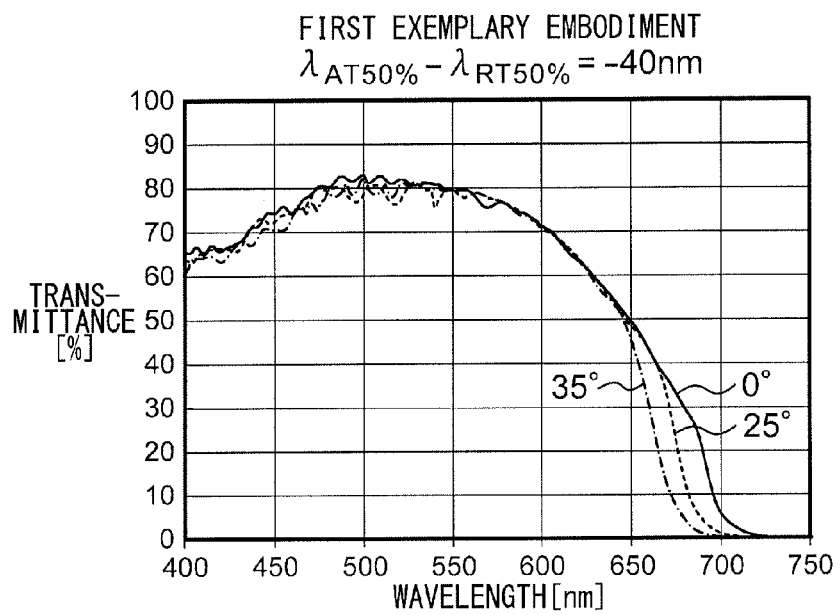
FIG. 6K shows the spectral transmittance of the infrared cut filter according to the first exemplary embodiment in which $\lambda_{AT50\%}-\lambda_{RT50\%}=-40$ nm.
Figure 6L:
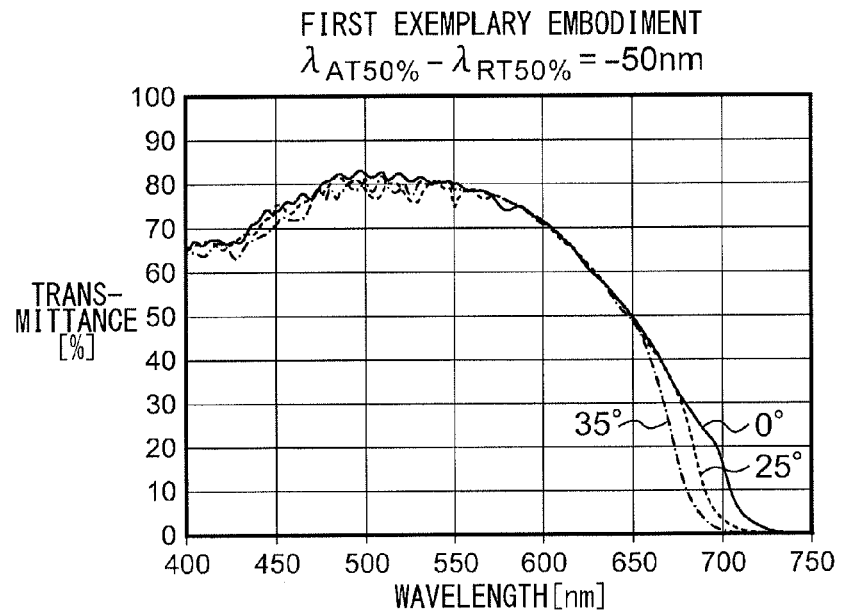
FIG. 6L shows the spectral transmittance of the infrared cut filter according to the first exemplary embodiment in which $\lambda_{AT50\%}-\lambda_{RT50\%}=-50$ nm.
Figure 6M:
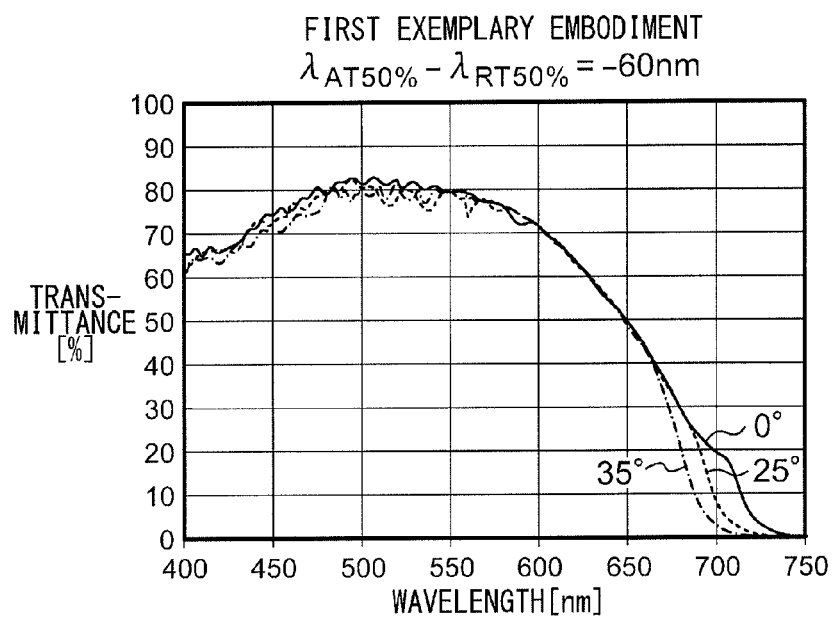
FIG. 6M shows the spectral transmittance of the infrared cut filter according to the first exemplary embodiment in which $\lambda_{AT50\%}-\lambda_{RT50\%}=-60$ nm.
Figure 7A:
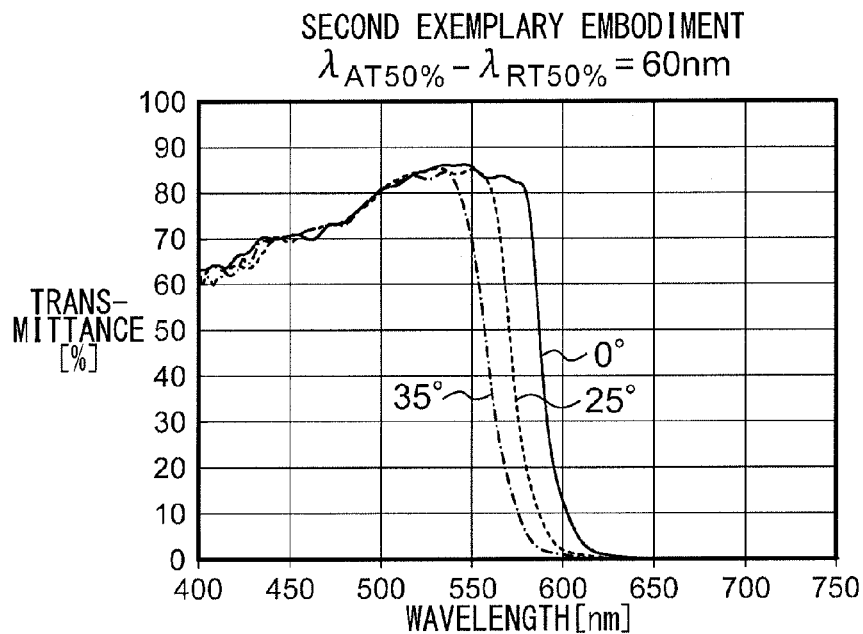
FIG. 7A shows the spectral transmittance of the infrared cut filter according to the second exemplary embodiment in which $\lambda_{AT50\%}-\lambda_{RT50\%}=60$ nm.
Figure 7B:
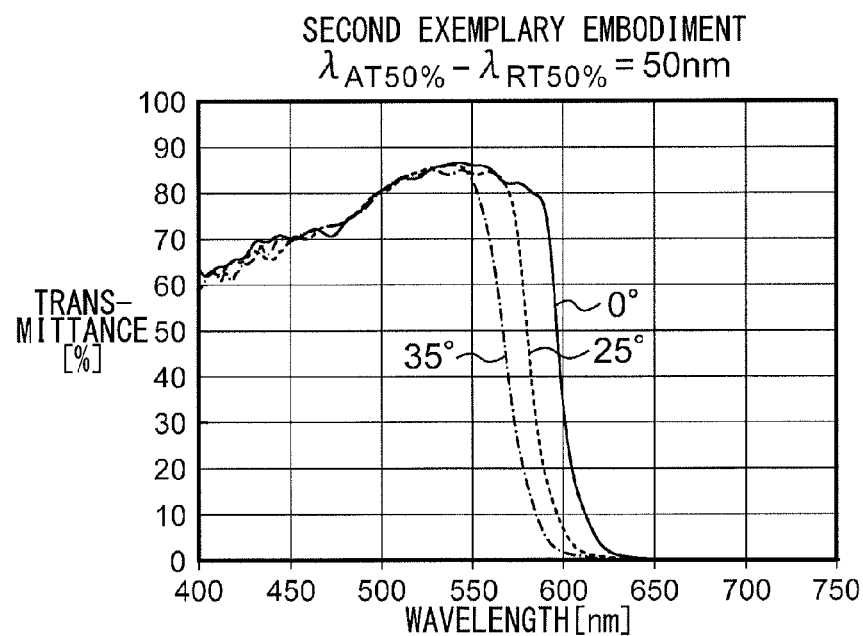
FIG. 7B shows the spectral transmittance of the infrared cut filter according to the second exemplary embodiment in which $\lambda_{AT50\%}-\lambda_{RT50\%}=50$ nm.
Figure 7C:
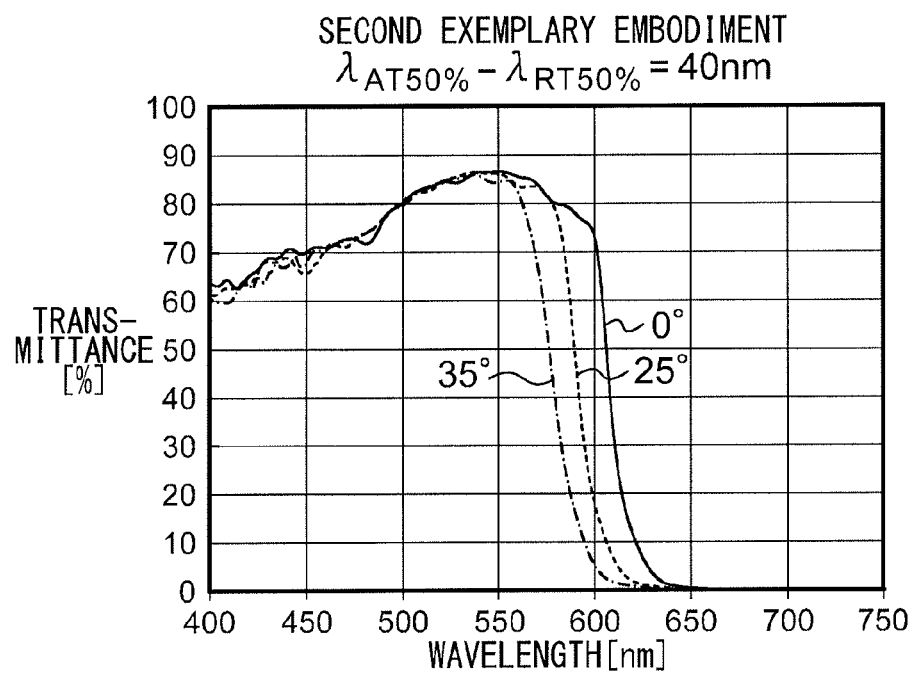
FIG. 7C shows the spectral transmittance of the infrared cut filter according to the second exemplary embodiment in which $\lambda_{AT50\%}-\lambda_{RT50\%}=40$ nm.
Figure 7D:
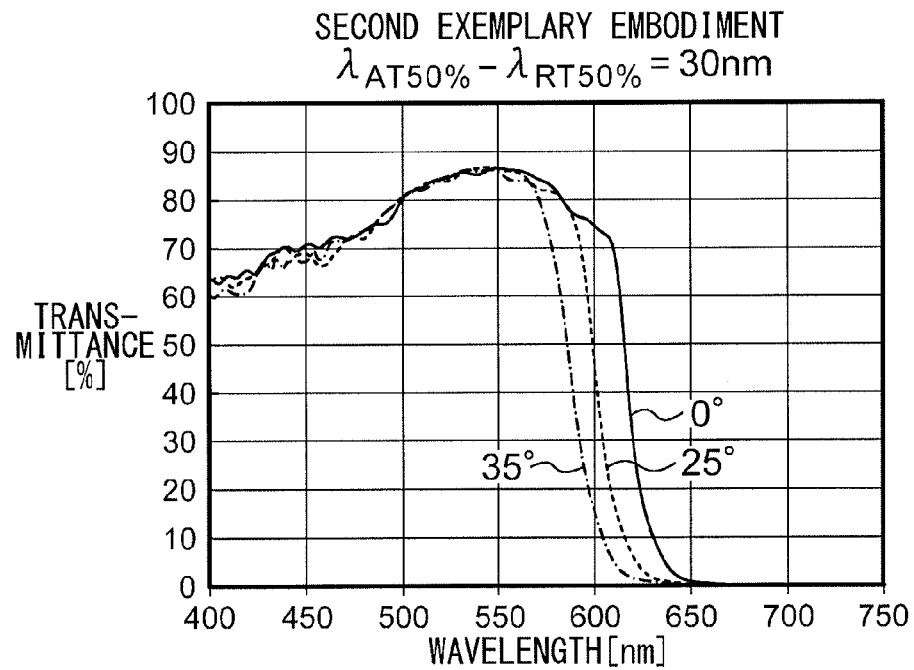
FIG. 7D shows the spectral transmittance of the infrared cut filter according to the second exemplary embodiment in which $\lambda_{AT50\%}-\lambda_{RT50\%}=30$ nm.
Figure 7E:
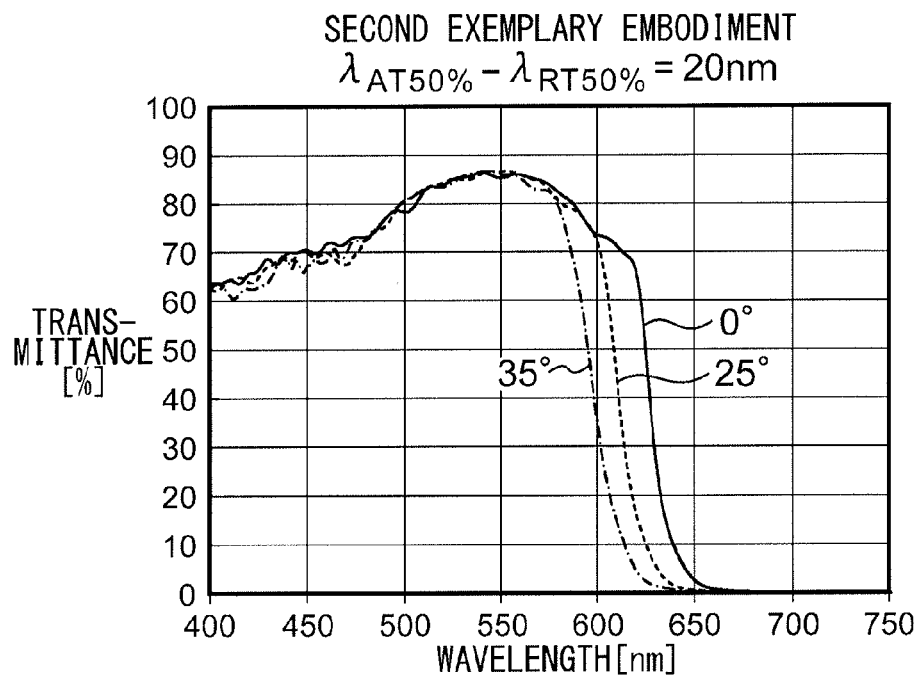
FIG. 7E shows the spectral transmittance of the infrared cut filter according to the second exemplary embodiment in which $\lambda_{AT50\%}-\lambda_{RT50\%}=20$ nm.
Figure 7F:
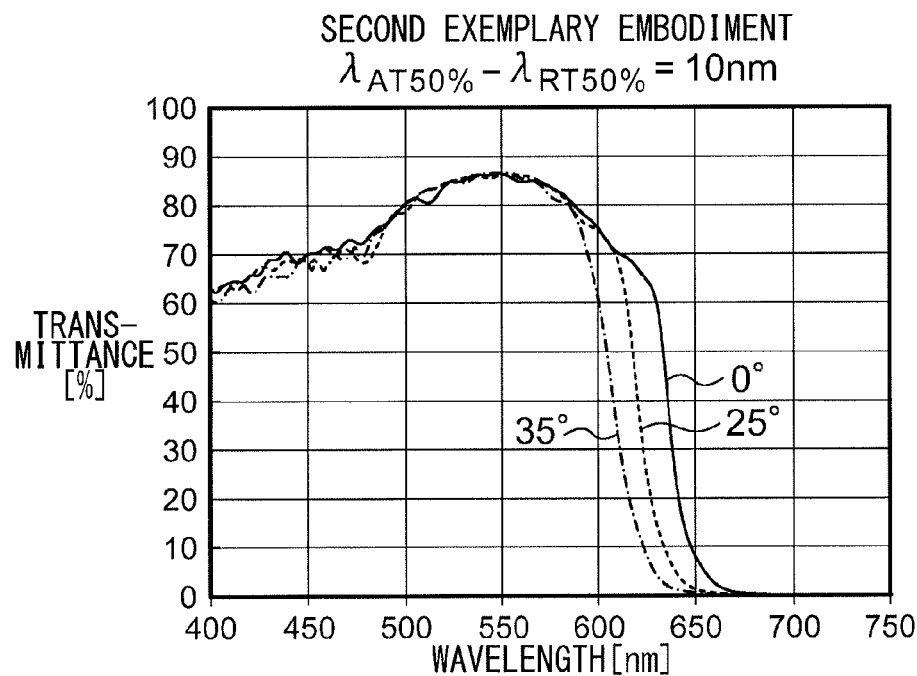
FIG. 7F shows the spectral transmittance of the infrared cut filter according to the second exemplary embodiment in which $\lambda_{AT50\%}-\lambda_{RT50\%}=10$ nm.
Figure 7G:
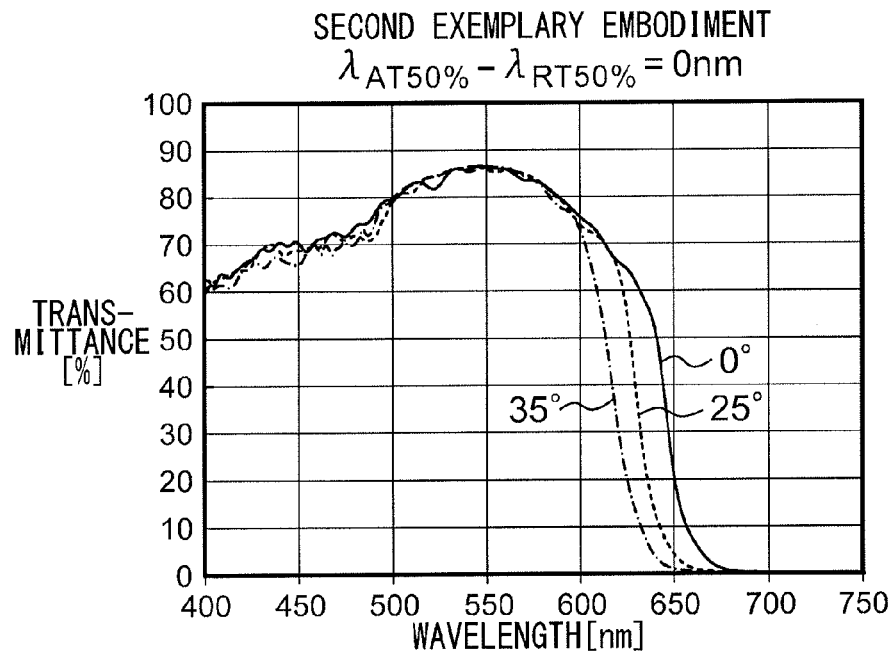
FIG. 7G shows the spectral transmittance of the infrared cut filter according to the second exemplary embodiment in which $\lambda_{AT50\%}-\lambda_{RT50\%}=0$ nm.
Figure 7H:
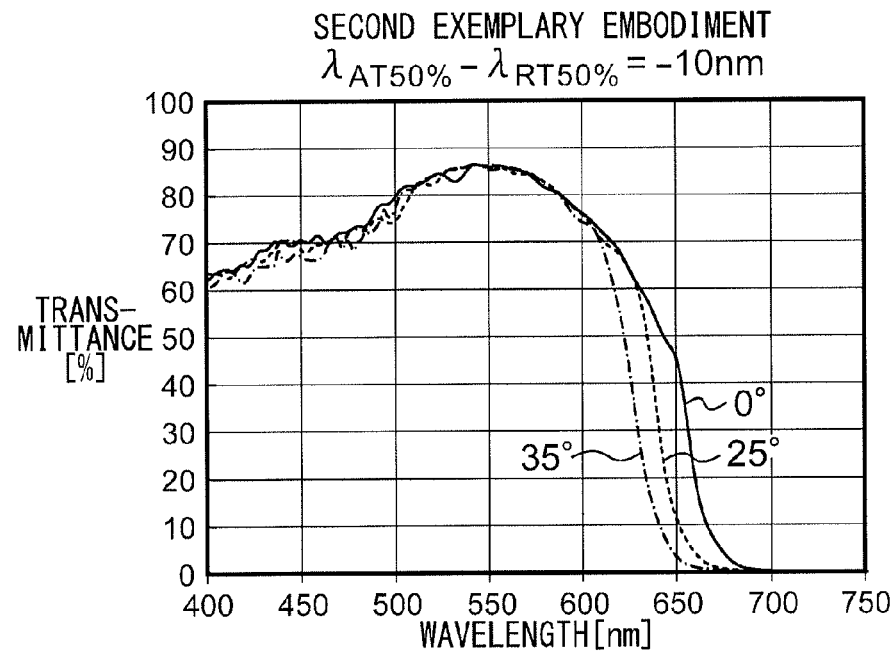
FIG. 7H shows the spectral transmittance of the infrared cut filter according to the second exemplary embodiment in which $\lambda_{AT50\%}-\lambda_{RT50\%}=-10$ nm.
Figure 7I:
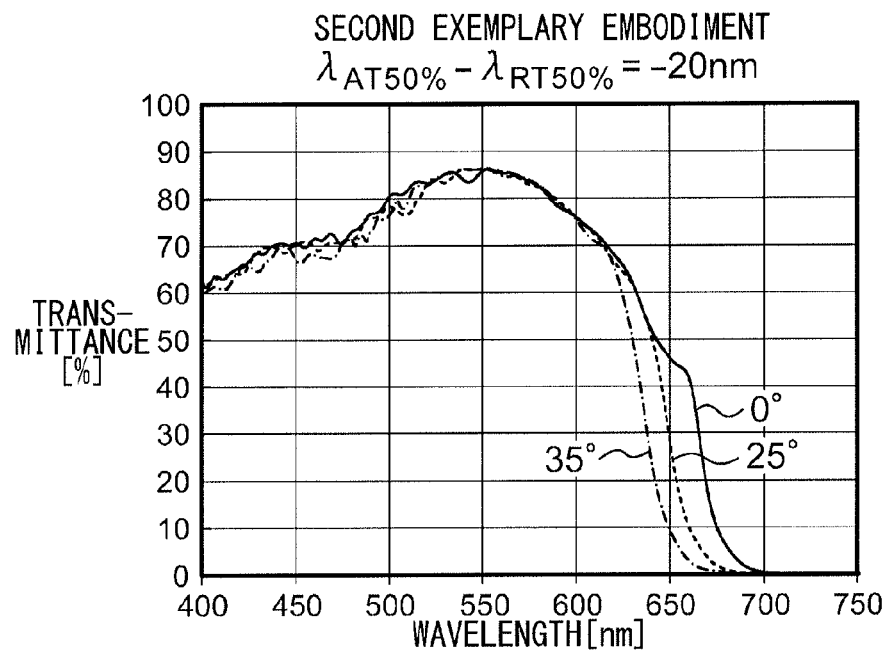
FIG. 7I shows the spectral transmittance of the infrared cut filter according to the second exemplary embodiment in which $\lambda_{AT50\%}-\lambda_{RT50\%}=-20$ nm.
Figure 7J:
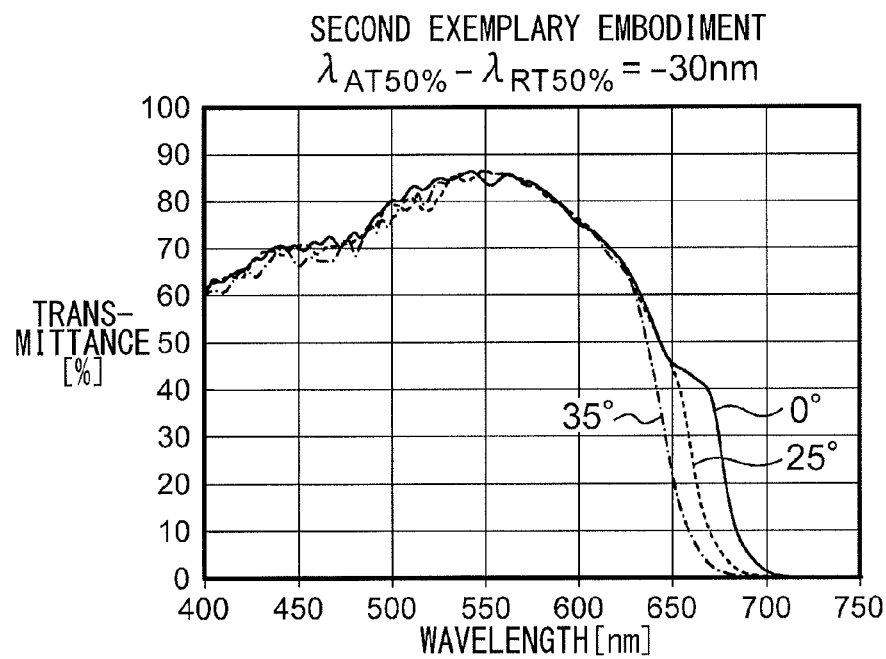
FIG. 7J shows the spectral transmittance of the infrared cut filter according to the second exemplary embodiment in which $\lambda_{AT50\%}-\lambda_{RT50\%}=-30$ nm.
Figure 7K:
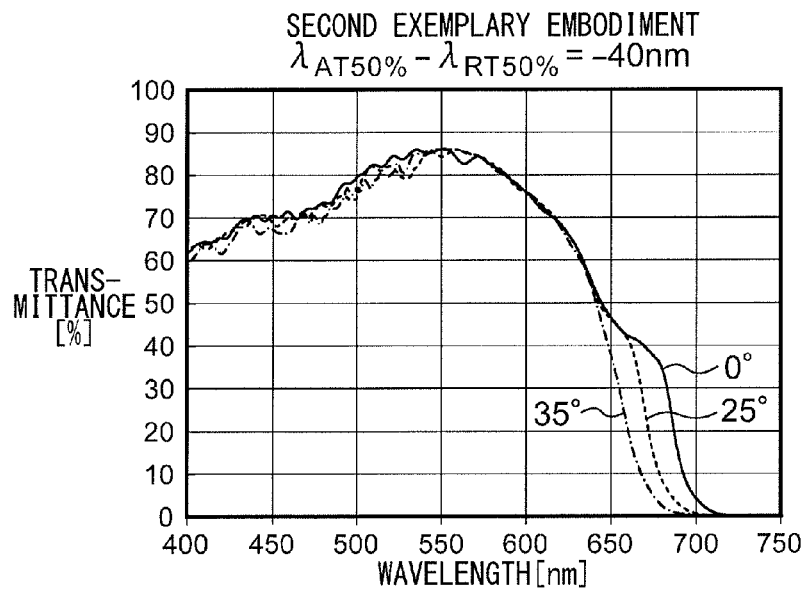
FIG. 7K shows the spectral transmittance of the infrared cut filter according to the second exemplary embodiment in which $\lambda_{AT50\%}-\lambda_{RT50\%}=-40$ nm.
Figure 7L:
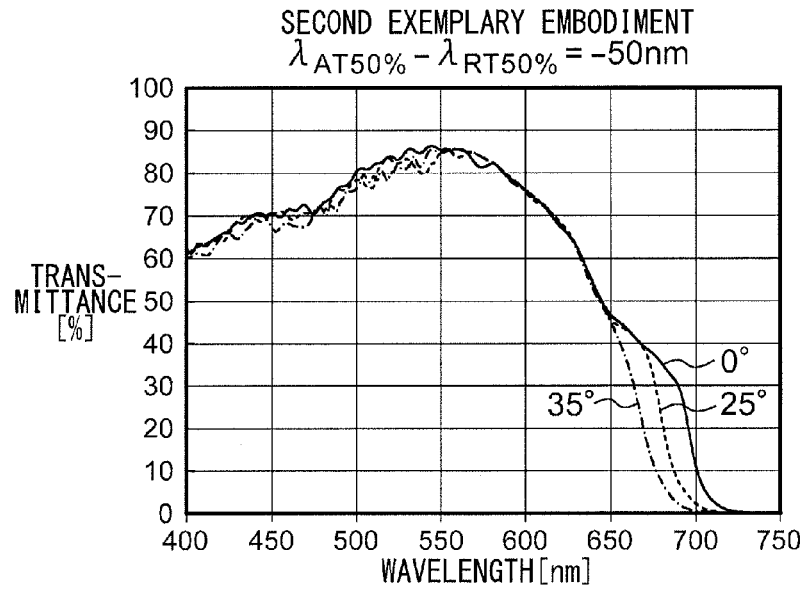
FIG. 7L shows the spectral transmittance of the infrared cut filter according to the second exemplary embodiment in which $\lambda_{AT50\%}-\lambda_{RT50\%}=-50$ nm.
Figure 7M:
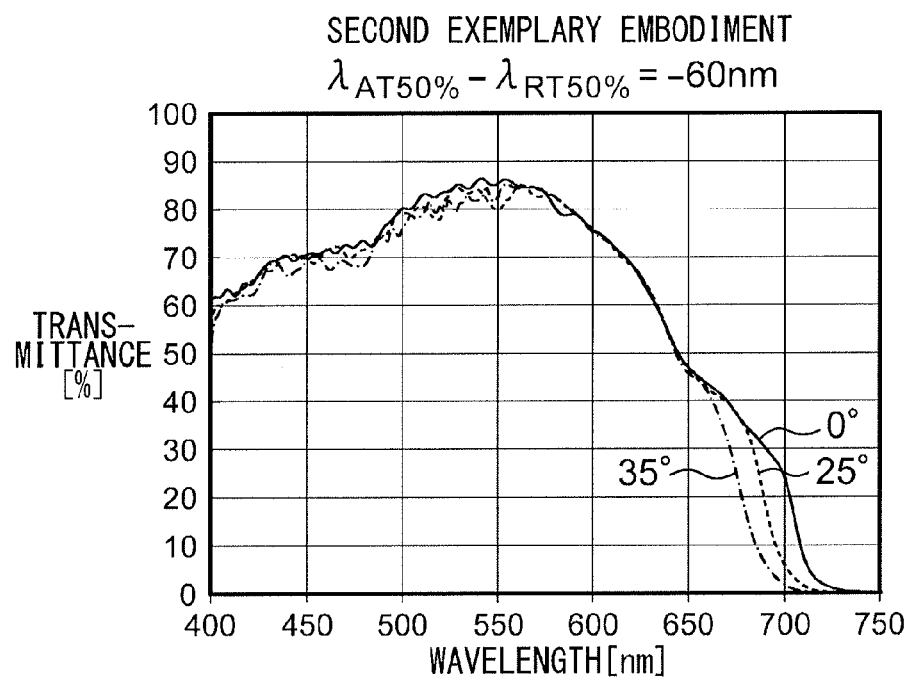
FIG. 7M shows the spectral transmittance of the infrared cut filter according to the second exemplary embodiment in which $\lambda_{AT50\%}-\lambda_{RT50\%}=-60$ nm.
Figure 8A:
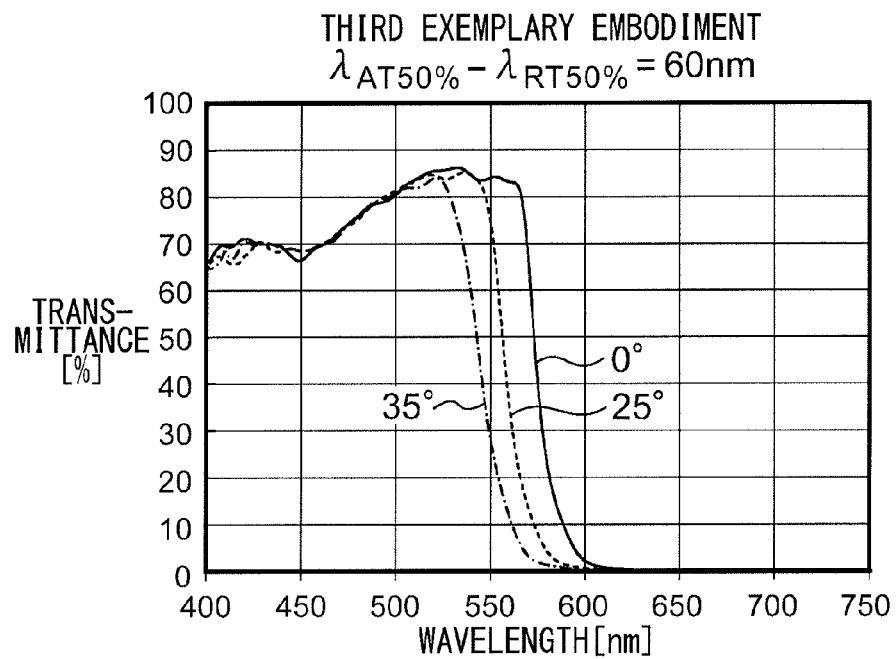
FIG. 8A shows the spectral transmittance of the infrared cut filter according to the third exemplary embodiment in which $\lambda_{AT50\%}-\lambda_{RT50\%}=60$ nm.
Figure 8B:
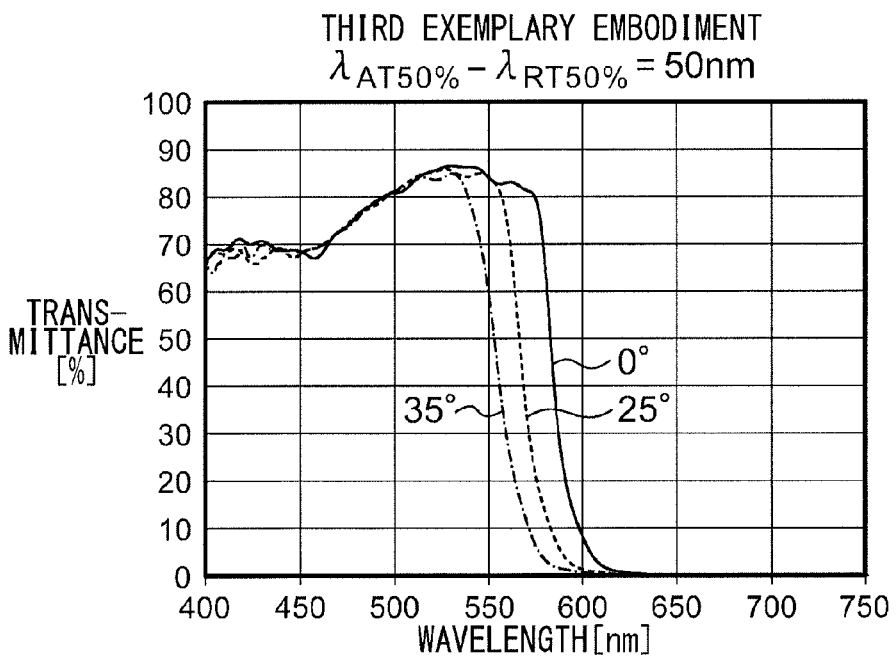
FIG. 8B shows the spectral transmittance of the infrared cut filter according to the third exemplary embodiment in which $\lambda_{AT50\%}-\lambda_{RT50\%}=50$ nm.
Figure 8C:
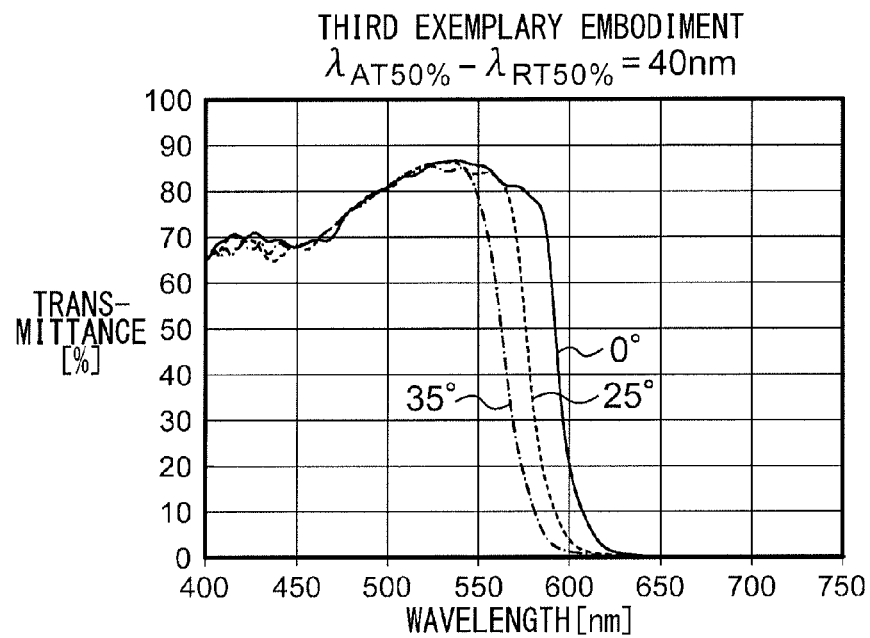
FIG. 8C shows the spectral transmittance of the infrared cut filter according to the third exemplary embodiment in which $\lambda_{AT50\%}-\lambda_{RT50\%}=40$ nm.
Figure 8D:
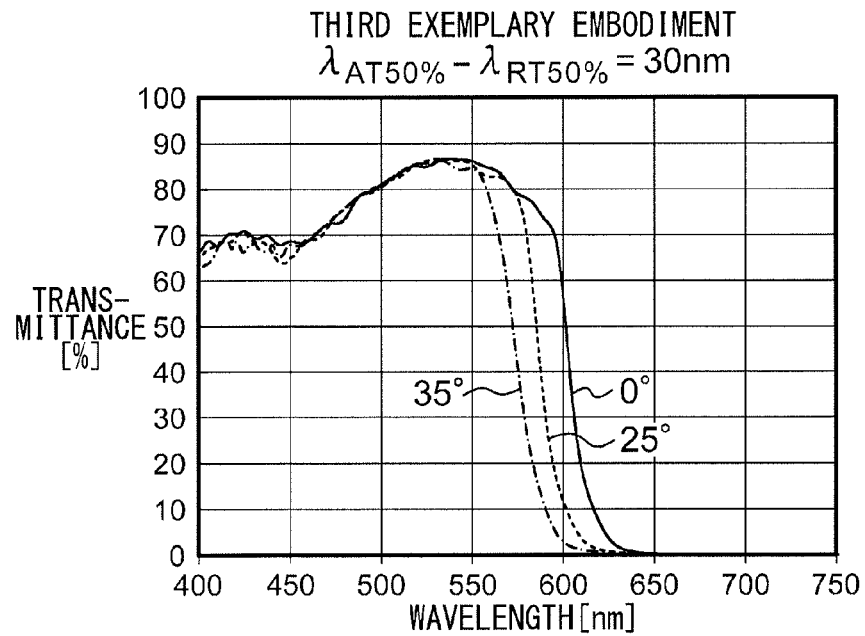
FIG. 8D shows the spectral transmittance of the infrared cut filter according to the third exemplary embodiment in which $\lambda_{AT50\%}-\lambda_{RT50\%}=30$ nm.
Figure 8E:
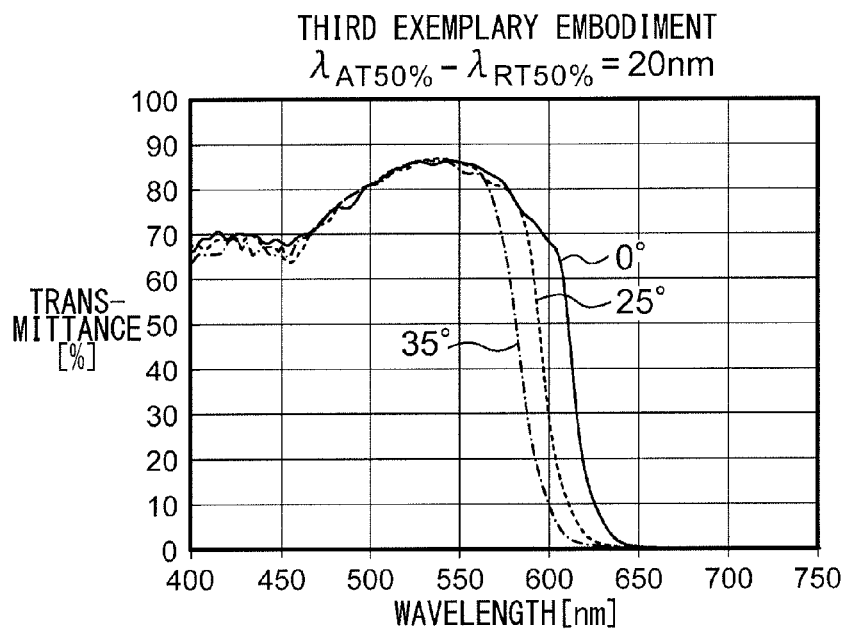
FIG. 8E shows the spectral transmittance of the infrared cut filter according to the third exemplary embodiment in which $\lambda_{AT50\%}-\lambda_{RT50\%}=20$ nm.
Figure 8F:
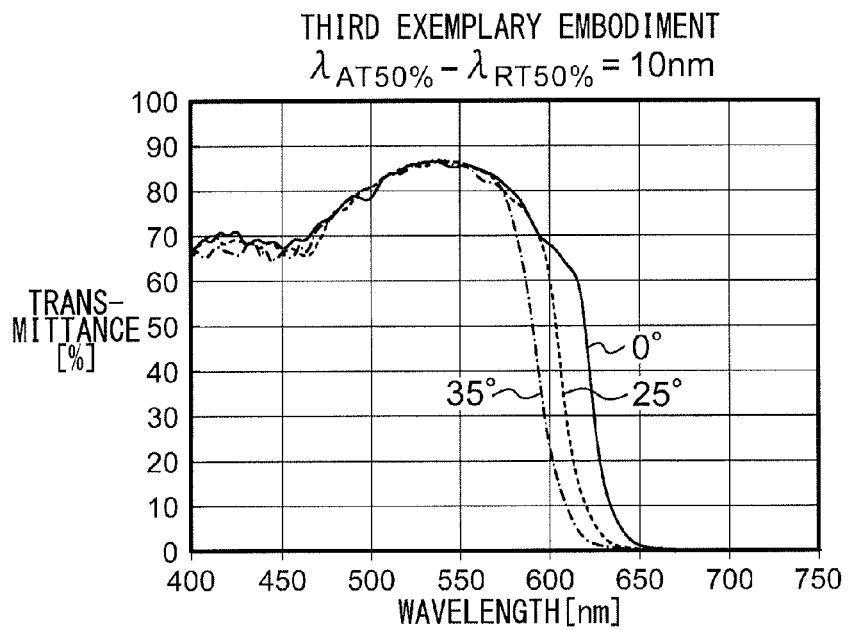
FIG. 8F shows the spectral transmittance of the infrared cut filter according to the third exemplary embodiment in which $\lambda_{AT50\%}-\lambda_{RT50\%}=10$ nm.
Figure 8G:
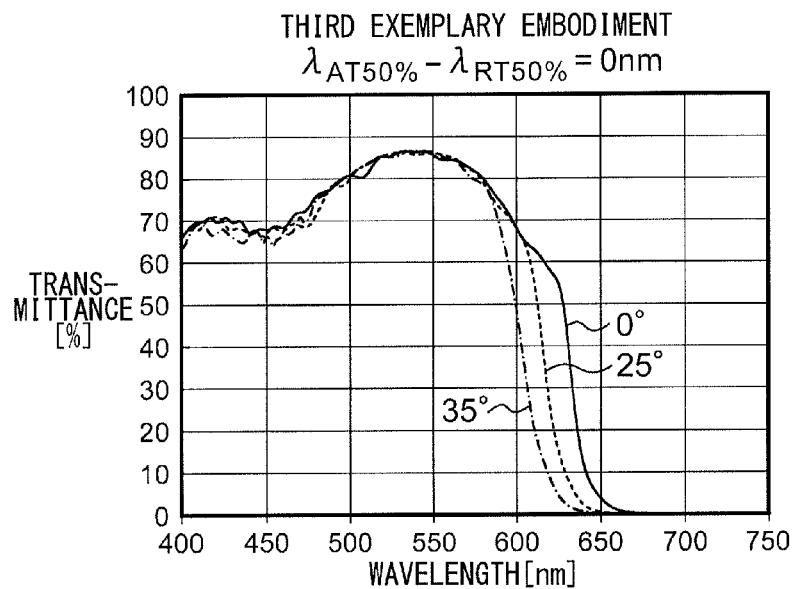
FIG. 8G shows the spectral transmittance of the infrared cut filter according to the third exemplary embodiment in which $\lambda_{AT50\%}-\lambda_{RT50\%}=0$ nm.
Figure 8H:
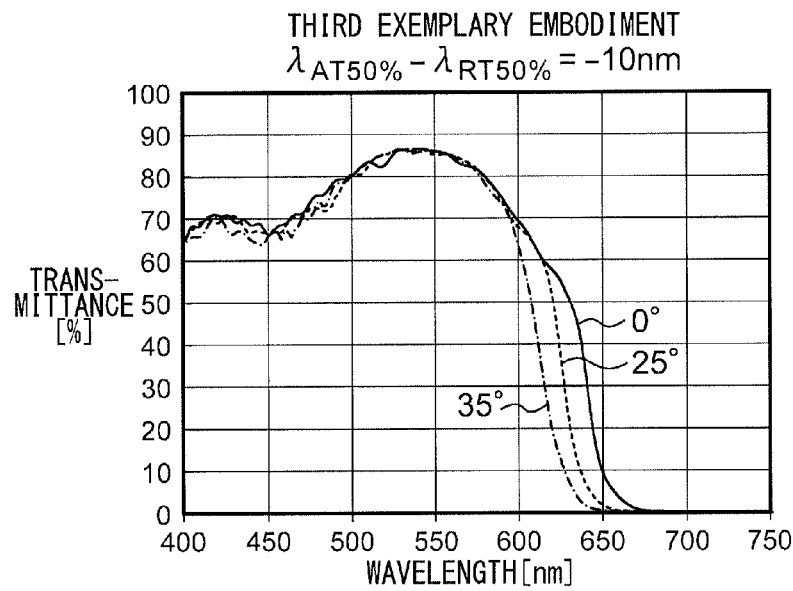
FIG. 8H shows the spectral transmittance of the infrared cut filter according to the third exemplary embodiment in which $\lambda_{AT50\%}-\lambda_{RT50\%}=-10$ nm.
Figure 8I:
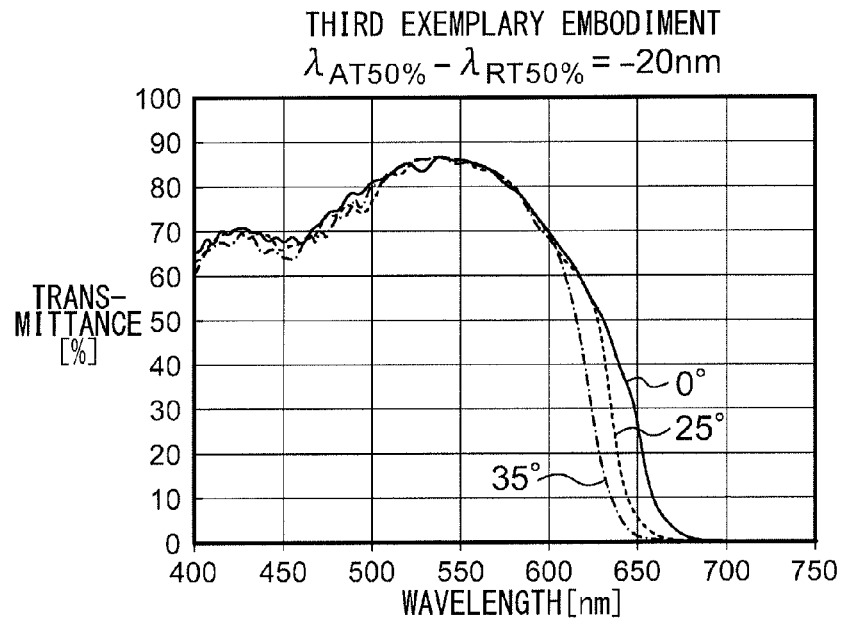
FIG. 8I shows the spectral transmittance of the infrared cut filter according to the third exemplary embodiment in which $\lambda_{AT50\%}-\lambda_{RT50\%}=-20$ nm.
Figure 8J:
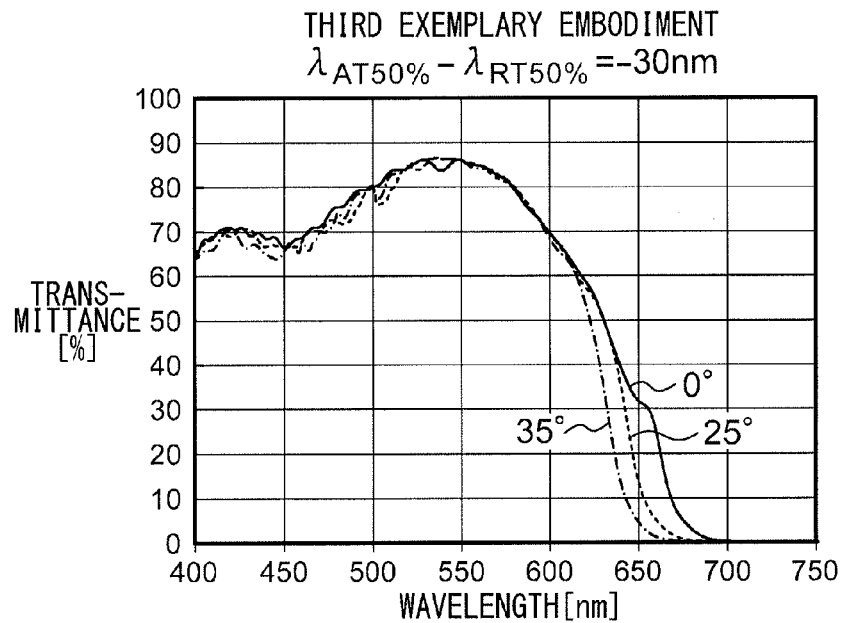
FIG. 8J shows the spectral transmittance of the infrared cut filter according to the third exemplary embodiment in which $\lambda_{AT50\%}-\lambda_{RT50\%}=-30$ nm.
Figure 8K:
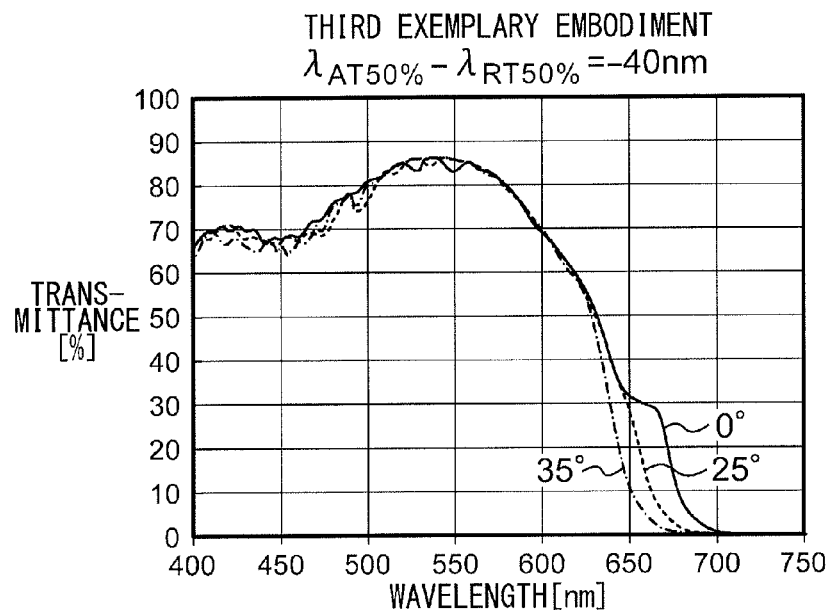
FIG. 8K shows the spectral transmittance of the infrared cut filter according to the third exemplary embodiment in which $\lambda_{AT50\%}-\lambda_{RT50\%}=-40$ nm.
Figure 8L:
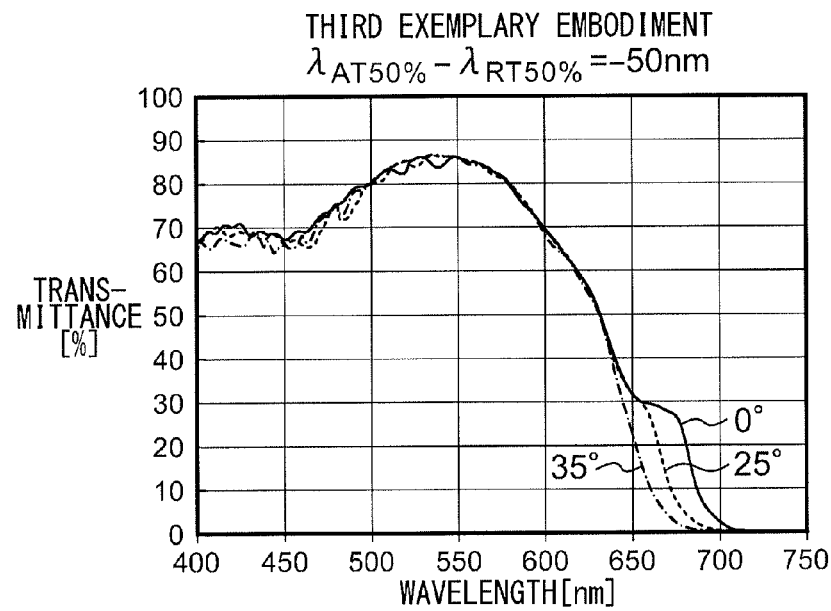
FIG. 8L shows the spectral transmittance of the infrared cut filter according to the third exemplary embodiment in which $\lambda_{AT50\%}-\lambda_{RT50\%}=-50$ nm.
Figure 8M:
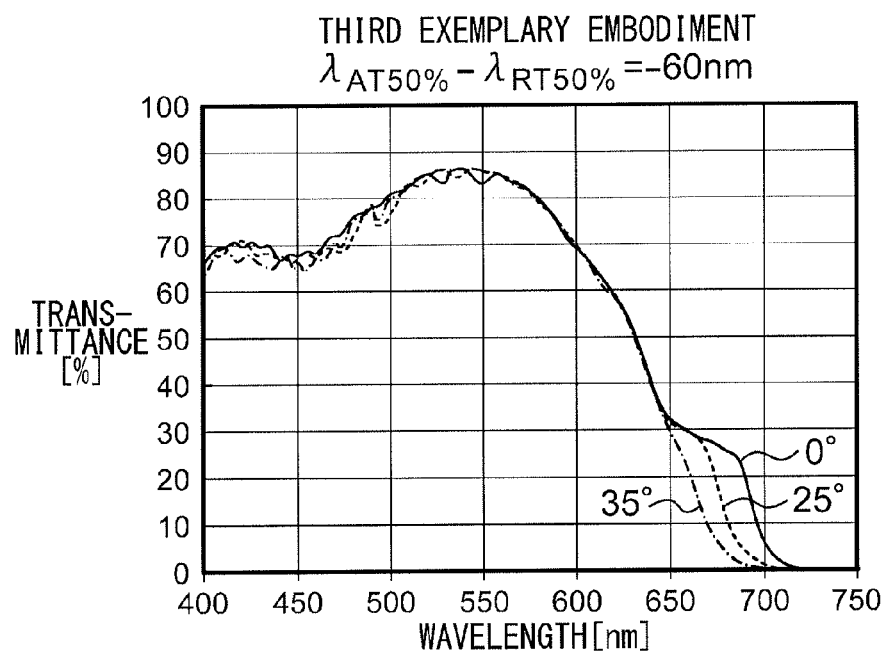
FIG. 8M shows the spectral transmittance of the infrared cut filter according to the third exemplary embodiment in which $\lambda_{AT50\%}-\lambda_{RT50\%}=-60$ nm.

FIGS. 6A, 7A, and 8A show the spectral transmittance curve of the infrared cut filter according to the first through third exemplary embodiments, respectively, in which $\lambda_{AT50\%} - \lambda_{RT50\%} = 60$ nm, i.e. $\lambda_{AT50\%}$ is longer than $\lambda_{RT50\%}$ by 60 nm. FIGS. 6B, 7B, and 8B show the spectral transmittance curve of the infrared cut filter according to the first through third exemplary embodiments, respectively, in which $\lambda_{AT50\%} - \lambda_{RT50\%} = 50$ nm, i.e. $\lambda_{AT50\%}$ is longer than $\lambda_{RT50\%}$ by 50 nm. FIGS. 6C, 7C, and 8C show the spectral transmittance curve of the infrared cut filter according to the first through third exemplary embodiments, respectively, in which $\lambda_{AT50\%} - \lambda_{RT50\%} = 40$ nm, i.e. $\lambda_{AT50\%}$ is longer than $\lambda_{RT50\%}$ by 40 nm. FIGS. 6D, 7D, and 8D show the spectral transmittance curve of the infrared cut filter according to the first through third exemplary embodiments, respectively, in which $\lambda_{AT50\%} - \lambda_{RT50\%} = 30$ nm, i.e. $\lambda_{AT50\%}$ is longer than $\lambda_{RT50\%}$ by 30 nm. FIGS. 6E, 7E, and 8E show the spectral transmittance curve of the infrared cut filter according to the first through third exemplary embodiments, respectively, in which $\lambda_{AT50\%} - \lambda_{RT50\%} = 20$ nm, i.e. $\lambda_{AT50\%}$ is longer than $\lambda_{RT50\%}$ by 20 nm. FIGS. 6F, 7F, and 8F show the spectral transmittance curve of the infrared cut filter according to the first through third exemplary embodiments, respectively, in which $\lambda_{AT50\%} - \lambda_{RT50\%} = 10$ nm, i.e. $\lambda_{AT50\%}$ is longer than $\lambda_{RT50\%}$ by 10 nm. FIGS. 6G, 7G, and 8G show the spectral transmittance curve of the infrared cut filter according to the first through third exemplary embodiments, respectively, in which $\lambda_{AT50\%} - \lambda_{RT50\%} = 0$ nm, i.e. $\lambda_{AT50\%}$ is equal to $\lambda_{RT50\%}$. FIGS. 6H, 7H, and 8H show the spectral transmittance curve of the infrared cut filter according to the first through third exemplary embodiments, respectively, in which $\lambda_{AT50\%} - \lambda_{RT50\%} = -10$ nm, i.e. $\lambda_{AT50\%}$ is shorter than $\lambda_{RT50\%}$ by 10 nm. FIGS. 6I, 7I, and 8I show the spectral transmittance curve of the infrared cut filter according to the first through third exemplary embodiments, respectively, in which $\lambda_{AT50\%} - \lambda_{RT50\%} = -20$ nm, i.e. $\lambda_{AT50\%}$ is shorter than $\lambda_{RT50\%}$ by 20 nm. FIGS. 6J, 7J, and 8J show the spectral transmittance curve of the infrared cut filter according to the first through third exemplary embodiments, respectively, in which $\lambda_{AT50\%}$-$\lambda_{RT50\%}$=−30 nm, i.e. $\lambda_{AT50\%}$ is shorter than $\lambda_{RT50\%}$ by 30 nm. FIGS. 6K, 7K, and 8K show the spectral transmittance curve of the infrared cut filter according to the first through third exemplary embodiments, respectively, in which $\lambda_{AT50\%}$-$\lambda_{RT50\%}$=−40 nm, i.e. $\lambda_{AT50\%}$ is shorter than $\lambda_{RT50\%}$ by 40 nm. FIGS. 6L, 7L, and 8L show the spectral transmittance curve of the infrared cut filter according to the first through third exemplary embodiments, respectively, in which $\lambda_{AT50\%}$-$\lambda_{RT50\%}$=−50 nm, i.e. $\lambda_{AT50\%}$ is shorter than $\lambda_{RT50\%}$ by 50 nm. FIGS. 6M, 7M, and 8M show the spectral transmittance curve of the infrared cut filter according to the first through third exemplary embodiments, respectively, in which $\lambda_{AT50\%}$-$\lambda_{RT50\%}$=−60 nm, i.e. $\lambda_{AT50\%}$ is shorter than $\lambda_{RT50\%}$ by 60 nm. The primary parameters of the spectral transmittance curve of FIGS. 6A-6M (first exemplary embodiment), the spectral transmittance curve of FIGS. 7A-7M (second exemplary embodiment), and the spectral transmittance curve of FIGS. 8A-8M (third exemplary embodiment) are shown in FIGS. 9, 10, and 11, respectively.

For evaluating the spectral transmittance curves shown in FIGS. 6A-6M, 7A-7M, and 8A-8M, we established (1) and (2) below as the property (hereinafter, referred to as "basic property") primarily required for the infrared cut filter.

(1) average transmittance $T_{ave}$ in the wavelength 400 nm-600 nm>70%

(2) $\lambda_{SLOPE}=|\lambda_{T50\%}-\lambda_{T2\%}|<70$ nm (sharp cut-off property)

With regard to the basic property related to the average transmittance $T_{ave}$ indicated in (1), the spectral transmittance curve shown in FIG. 8A obtained when $\lambda_{AT50\%}$-$\lambda_{RT50\%}$=60 nm does not fulfill the requirement. However, the spectral transmittance curves shown in FIGS. 6A-6M, 7A-7M and 8B-8M meet the basic property of (1).

Figure 12A:
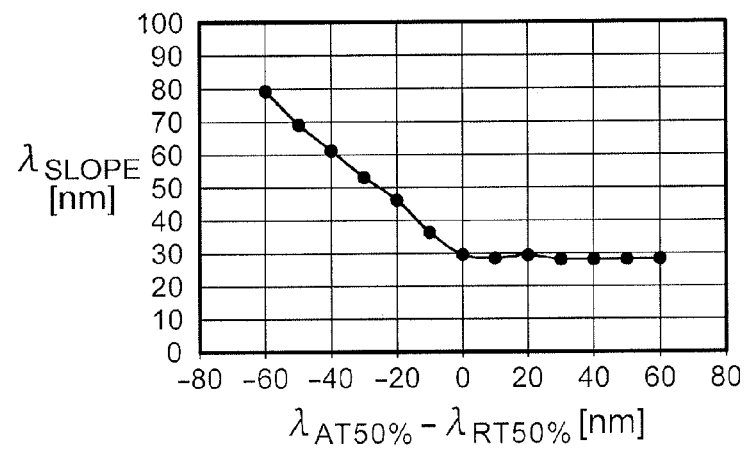
FIG. 12A shows the relationship, in the first exemplary embodiment, of the difference between the cut-off wavelength of the infrared absorbing layer and the cut-off wavelength of the infrared reflecting layer relative to the steepness of the transient range of the spectral transmittance curve.
Figure 13A:
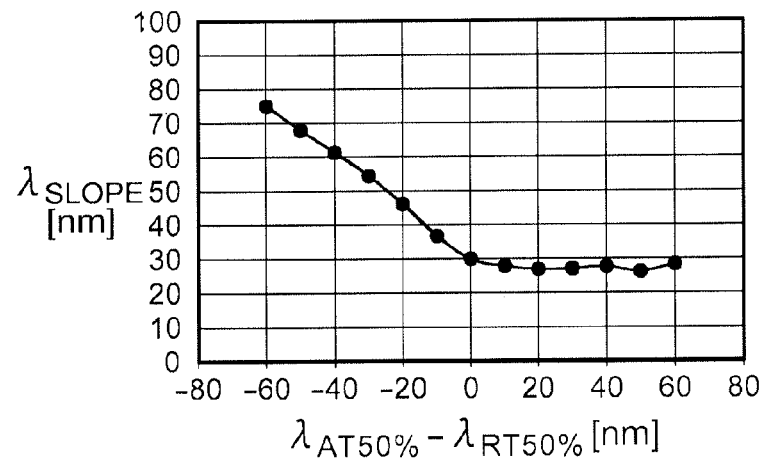
FIG. 13A shows the relationship, in the second exemplary embodiment, of the difference between the cut-off wavelength of the infrared absorbing layer and the cut-off wavelength of the infrared reflecting layer relative to the steepness of the transient range of the spectral transmittance curve.
Figure 14A:
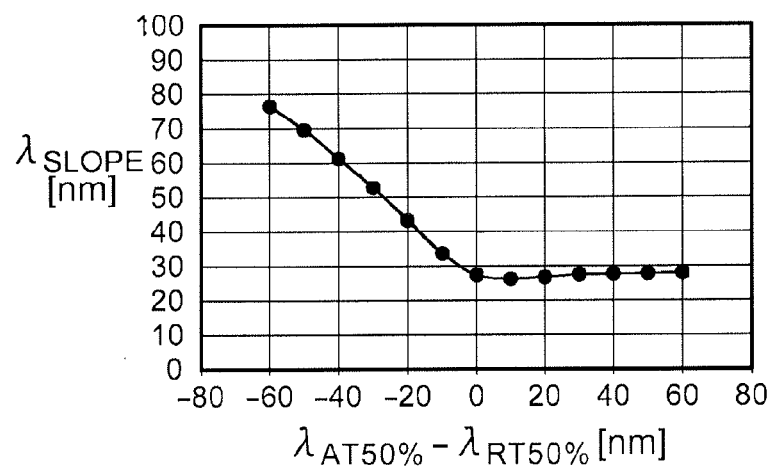
FIG. 14A shows the relationship, in the third exemplary embodiment, of the difference between the cut-off wavelength of the infrared absorbing layer and the cut-off wavelength of the infrared reflecting layer relative to the steepness of the transient range of the spectral transmittance curve.

FIGS. 12A, 13A, and 14A respectively show the relationship in the first through third exemplary embodiments of the difference $\lambda_{AT50\%}$-$\lambda_{RT50\%}$ between the cut-off wavelength $\lambda_{AT50\%}$ of the infrared absorbing layer 16 and the cut-off wavelength $\lambda_{RT50\%}$ of the infrared reflecting layer 14 relative to the steepness $\lambda_{SLOPE}=|\lambda_{T50\%}-\lambda_{T2\%}|$ of the transient range of the spectral transmittance curve. As described above, the steepness (sharp cut-off property) of the spectral transmittance curve of the infrared cut filter in the transient range is preferably as small as possible, and, more specifically, less than 70 nm, as required by the basic property (2) above. Thus, FIGS. 12A, 13A, and 14A show that the condition of −50≤$\lambda_{AT50\%}$-$\lambda_{RT50\%}$ is preferable.

Figure 12B:
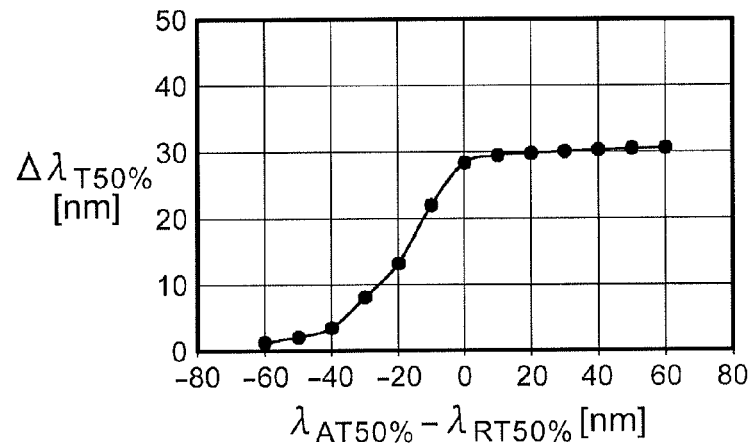
FIG. 12B shows the relationship, in the first exemplary embodiment, of the difference between the cut-off wavelength of the infrared absorbing layer and the cut-off wavelength of the infrared reflecting layer relative to the amount of shift of the cut-off wavelength occurring when the incident angle changes from 0° to 35°.
Figure 13B:
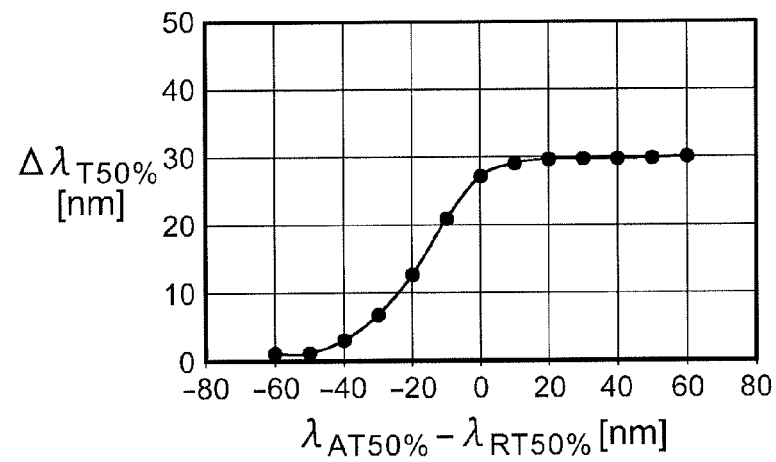
FIG. 13B shows the relationship, in the second exemplary embodiment, of the difference between the cut-off wavelength of the infrared absorbing layer and the cut-off wavelength of the infrared reflecting layer relative to the amount of shift of the cut-off wavelength occurring when the incident angle changes from 0° to 35°.
Figure 14B:
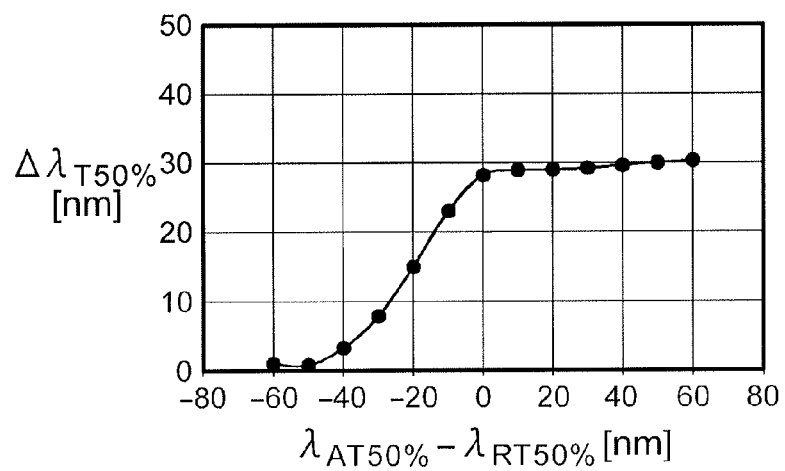
FIG. 14B shows the relationship, in the third exemplary embodiment, of the difference between the cut-off wavelength of the infrared absorbing layer and the cut-off wavelength of the infrared reflecting layer relative to the amount of shift of the cut-off wavelength occurring when the incident angle changes from 0° to 35°.

We established (3) below as the property necessary for improvement in the dependence of the infrared shielding property on the incident angle, the primary problem of the present invention. Given that the shift amount in the cut-off wavelength $\lambda_{T50\%}$ obtained when the incident angle changes from 0° to 35° is denoted by $\Delta\lambda_{T50\%}$, (3) $\Delta\lambda_{T50\%}<25$ nm FIGS. 12B, 13B, and 14B respectively show the relationship in the first through third embodiments of the difference $\lambda_{T50\%}$-$\lambda_{RT50\%}$ between the cut-off wavelength $\lambda_{AT50\%}$ of the infrared absorbing layer 16 and the cut-off wavelength $\lambda_{RT50\%}$ of the infrared reflecting layer 14 relative to the shift amount $\Delta\lambda_{T50\%}$ of the cut-off wavelength $\lambda_{T50\%}$ occurring when the incident angle changes from 0° to 35°. It is preferable that $\Delta\lambda_{T50\%}$ be less than 25 nm, as required by property (3) above. Thus, FIGS. 12B, 13B, and 14B show that it is preferable that $\lambda_{AT50\%}$-$\lambda_{RT50\%}$≤−10 nm.

Based on the foregoing considerations, it is preferable that the difference between the cut-off wavelength $\lambda_{AT50\%}$ of the infrared absorbing layer 16 and the cut-off wavelength $\lambda_{RT50\%}$ of the infrared reflecting layer 14 meet the following condition.

$$-50\text{ nm}\leq\lambda_{AT50\%}-\lambda_{RT50\%}\leq-10\text{ nm}$$

By meeting all of the above requirements for property, favorable images can be obtained in which balance is achieved in factors (e.g. transmittance and color quality) contributing to image quality. The requirements for property listed above are by way of example only and can be modified so as to adapt to the property of the imaging device.

Described above is the infrared cut filter 10 according to the embodiment. The embodiment provides the infrared cut filter 10 having favorable infrared shielding property characterized by little dependence on the incident angle, by forming the infrared reflecting layer 14 on one surface of the transparent dielectric substrate 12 and forming the infrared absorbing layer 16 on the other surface.

In the infrared cut filter 10 according to the embodiment, an ordinary glass substrate can be used as the transparent dielectric substrate 12. Since it is not necessary to use fragile glass such as fluorophosphate glass which is not easy to work (e.g. to polish), the substrate can be worked in an ordinary manner (e.g. polished or cut). As a result, the thickness of the substrate can be controlled at will. For example, a thin substrate can be produced.

The property of the infrared cut filter 10 according to the embodiment is determined by the combination of the optical property of the infrared reflecting layer 14 and the optical property of the infrared absorbing layer 16. The optical property of the infrared reflecting layer 14 can be changed easily by adjusting the layer structure of the dielectric multilayer film. Also, the optical property of the infrared absorbing layer 16 can be changed easily by adjusting the type or concentration of infrared absorbing pigment included in the resin matrix or adjusting the thickness of the infrared absorbing layer. If fluorophosphate glass is used in order to impart the substrate with the infrared absorbing capability, change in the infrared absorbing property requires melting of fluorophosphate glass using an furnace, cutting of fluorophosphate glass, polishing of fluorophosphate glass for the purpose of adjusting the thickness, etc. Therefore, it is not easy to change the property. Thus, the infrared cut filter 10 according to the embodiment is also excellent in that the optical property of the infrared cut filter 10 can be changed easily.

The infrared reflecting layer 14 of the infrared cut filter 10 shown in FIG. 1 may be formed to reflect ultraviolet light. By forming the infrared reflecting layer 14 of a dielectric multilayer film, the ultraviolet reflecting function can be provided in the infrared cut filter 10 easily by adjusting the layer structure. The color filter provided in the imaging device may be adversely affected by ultraviolet light in that the life is shortened. Therefore, by removing ultraviolet light in the infrared reflecting layer 14 located in front of the imaging device, such an impact is avoided. By building the ultraviolet reflecting function in the infrared reflecting layer 14, ultraviolet light can be removed before reaching the infrared absorbing layer 16 formed of a resin matrix so that degradation of the infrared absorbing layer 16 can be prevented.

Figure 15:
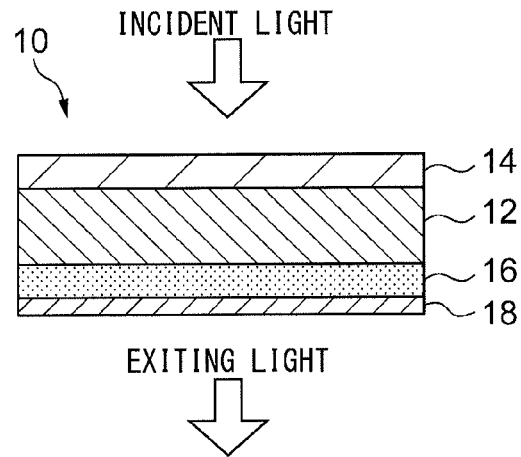
FIG. 15 shows the infrared cut filter according to another embodiment of the present invention.

FIG. 15 shows the infrared cut filter 10 according to another embodiment of the present invention. Those components of the infrared cut filter 10 shown in FIG. 15 that are identical or corresponding to components of the infrared cut filter shown in FIG. 1 are represented by the same reference symbols and the description is omitted as appropriate.

The infrared cut filter 10 according to this embodiment differs from the infrared cut filter shown in FIG. 1 in that a protective layer 18 is formed on the infrared absorbing layer 16. As shown in FIG. 15, the protective layer 18 is formed on the surface of the infrared absorbing layer 16 opposite to the surface facing the transparent dielectric substrate 12. In the infrared cut filter according to this embodiment, light exits through the protective layer 18.

Since the infrared absorbing layer 16 contains infrared absorbing pigment, the layer 16 contains organic components. For this reason, the infrared absorbing layer 16 has relatively low abrasion resistance and humidity resistance. Therefore, by providing on the infrared absorbing layer 16 the protective layer 18 having a different composition from the infrared absorbing layer 16 as in this embodiment, the infrared absorbing layer 16 can be protected.

For example, the protective layer 18 may be a sol-gel hard coating comprising tetraethyl orthosilicate (TEOS) as a main component. The protective layer 18 may be formed by (a) applying a hard coat agent on the infrared absorbing layer 16, (b) coating the infrared absorbing layer 16 with a sol-gel film, (c) vapor-depositing a dielectric film such as an $SiO_2$ layer on the infrared absorbing layer 16. However, the method is non-limiting.

In the infrared cut filter 10 shown in FIG. 15, the protective layer 18 may be formed to prevent reflection of visible light. By covering the infrared absorbing layer 16 using a material with a refractive index lower than that of the infrared absorbing layer 16, the protective layer 18 is provided with the function of preventing reflection of visible light. As a result, the visible light transmittance can be improved in the infrared cut filter 10 as a whole. Alternatively, a reflection preventing film formed of a dielectric multilayer film may be deposited on the infrared absorbing layer 16 to form a protective layer 18.

The protective layer 18 in the infrared cut filter shown in FIG. 15 may be formed to prevent transmittance of ultraviolet light. This prevents ultraviolet light incident, from the light exiting surface, from reaching the imaging device and so prevents degradation of the color filter provided in the imaging device.

Figure 16:
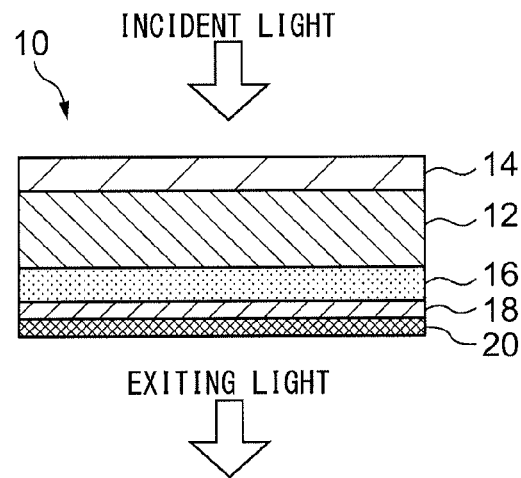
FIG. 16 shows the infrared cut filter according to still another embodiment of the present invention.

FIG. 16 shows the infrared cut filter 10 according to still another embodiment of the present invention. Those components of the infrared cut filter 10 shown in FIG. 16 that are identical or corresponding to components of the infrared cut filter shown in FIGS. 1 and 15 are represented by the same reference symbols and the description is omitted as appropriate.

The infrared cut filter 10 according to this embodiment differs from the infrared cut filter shown in FIG. 15 in that a reflection prevention layer 20 for preventing reflection of visible light is formed on the protective layer 18. As shown in FIG. 16, the reflection prevention layer 20 is formed on the surface of the protective layer 18 opposite to the surface facing the infrared absorbing layer 16. In the infrared cut filter 10 according to this embodiment, light exits through the reflection prevention layer 20.

Forming the reflection prevention layer 20 on the protective layer 18 as in the infrared cut filter 10 according to this embodiment also facilitates improvement in the visible light transmittance of the infrared cut filter 10 as a whole.

The reflection prevention layer 20 in the infrared cut filter 10 shown in FIG. 16 may be formed to prevent ultraviolet light transmittance. This prevents ultraviolet light incident, from the light exiting surface, from reaching the imaging device and prevents degradation of the color filter provided in the imaging device.

Figure 17:
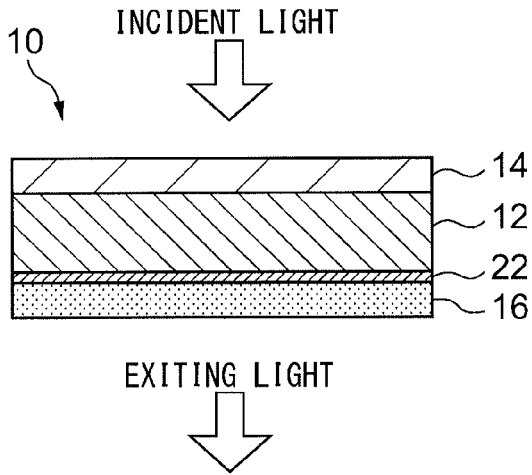
FIG. 17 shows the infrared cut filter according to yet another embodiment of the present invention.

FIG. 17 shows the infrared cut filter 10 according to yet another embodiment of the present invention. Those components of the infrared cut filter 10 shown in FIG. 17 that are identical or corresponding to components of the infrared cut filter shown in FIG. 1 are represented by the same reference symbols and the description is omitted as appropriate.

The infrared cut filter 10 according to this embodiment differs from the infrared cut filter shown in FIG. 1 in that a primer layer 22 is formed between the transparent dielectric substrate 12 and the infrared absorbing layer 16. By forming the primer layer 22 between the transparent dielectric substrate 12 and the infrared absorbing layer 16, adhesion property between the transparent dielectric substrate 12 and the infrared absorbing layer 16 is improved so that the environmental resistance of the infrared cut filter 10 is improved.

Figure 18:
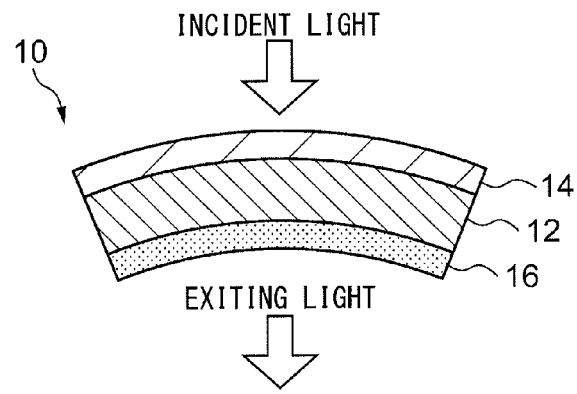
FIG. 18 shows the infrared cut filter according to yet another embodiment of the present invention.

FIG. 18 shows the infrared cut filter 10 according to yet another embodiment of the present invention. Those components of the infrared cut filter 10 shown in FIG. 18 that are identical or corresponding to components of the infrared cut filter shown in FIG. 1 are represented by the same reference symbols and the description is omitted as appropriate.

The infrared cut filter 10 according to this embodiment differs from the infrared cut filter shown in FIG. 1 in that the infrared reflecting layer 14 is warped. The infrared reflecting layer 14 is warped such that the surface opposite to the surface on the side of the transparent dielectric substrate 12 is convex. In association with the warp of the infrared reflecting layer 14, the transparent dielectric substrate 12 and the infrared absorbing layer 16 according to this embodiment are also warped.

As described above, when the infrared cut filter 10 is used in the imaging apparatus, the filter 10 is mounted such that the infrared reflecting layer 14 faces the imaging lens and the infrared absorbing layer 16 faces the imaging device. However, the infrared cut filter 10 is extremely thin and small so that it is not easy to distinguish between the infrared reflecting layer 14 and the infrared absorbing layer 16. Therefore, warping of the infrared reflecting layer 14 allows the layer 14 to be identified visually. By controlling the stress on the film surface when the dielectric multilayer film is deposited on the transparent dielectric substrate 12, the degree of warp of the infrared reflecting layer 14 can be adjusted without affecting the optical property.

Figure 19:
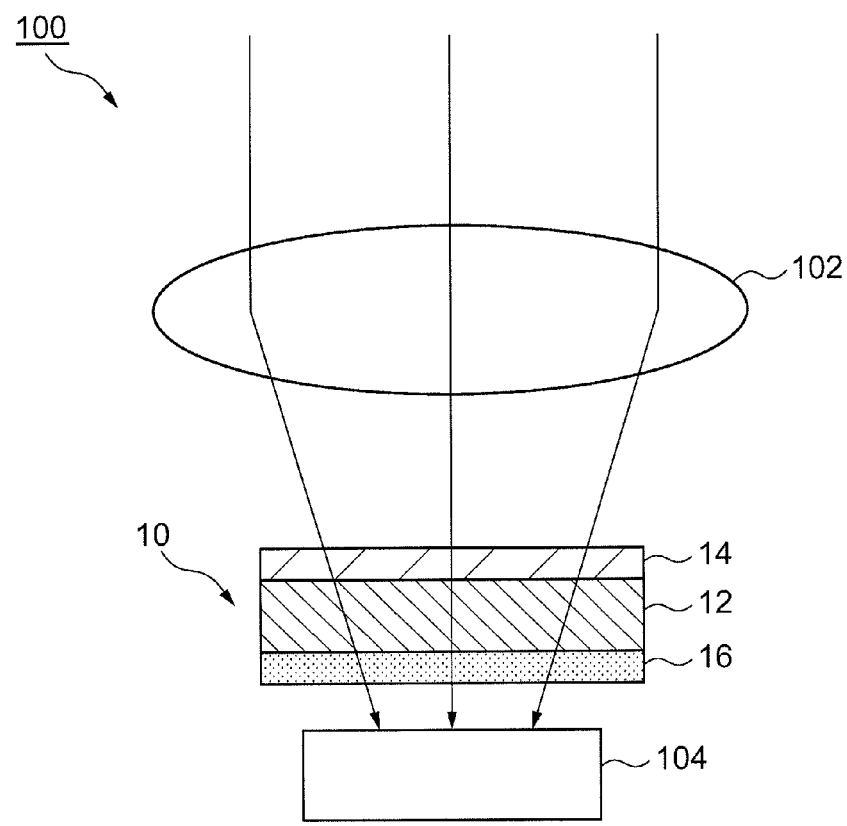
FIG. 19 shows an imaging apparatus in which the infrared cut filter according to the embodiments of the present invention is used.

FIG. 19 shows an imaging apparatus 100 in which the infrared cut filter 10 according to the embodiments of the present invention is used. As shown FIG. 19, the imaging apparatus 100 includes an imaging lens 102, the infrared cut filter 10, and an imaging device 104. The imaging device 104 may be a semiconductor solid-state imaging device such as a CCD or a CMOS. As shown in FIG. 19, the infrared cut filter 10 is provided between the imaging lens 102 and the imaging device 104 such that the infrared reflecting layer 14 faces the imaging lens 102 and the infrared absorbing layer 16 faces the imaging device 104.

As shown in FIG. 19, light from a subject is condensed by the imaging lens 102. Infrared light is removed by the infrared cut filter 10. The resultant light is incident on the imaging device 104. As shown in FIG. 19, the light is incident on the infrared cut filter 10 from the imaging lens 102 at various angles of incidence. By using the infrared cut filter 10 according to any of the embodiments, infrared light can be suitably shielded regardless of the incident angle. Therefore, favorable images with high color reproducibility can be captured.

The embodiments as described above are used as the infrared cut filter 10 in the imaging apparatus. Alternatively, the infrared cut filter 10 according to the embodiments can be put to other uses. For example, the infrared cut filter 10 can be used as a heat shielding film for a wind shield glass or a side window of automobiles, or for architectural glass. Still alternatively, the infrared cut filter 10 can be used as an infrared cut filter for a plasma display panel (PDP).

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An infrared cut filter comprising:
 a transparent dielectric substrate;
 an infrared reflecting layer formed on one surface of the transparent dielectric substrate and configured to reflect infrared light; and
 an infrared absorbing layer formed on the other surface of the transparent dielectric substrate and configured to absorb infrared light, wherein
 the infrared absorbing layer is formed of a resin that contains infrared absorbing pigment,
 the infrared reflecting layer is formed of a dielectric multilayer film,
 given that a wavelength that provides the transmittance of 50% of the infrared reflecting layer, when an incident angle is 0°, is $\lambda_{RT50\%}$ nm and the wavelength that provides the transmittance of 50% of the infrared absorbing layer, when the incident angle is 0°, is $\lambda_{AT50\%}$ nm, the infrared reflecting layer and the infrared absorbing layer are formed such that $\lambda_{AT50\%} - \lambda_{RT50\%} \leq -10$ nm is met,
 the infrared reflecting layer and the infrared absorbing layer are formed such that $-50$ nm $\leq \lambda_{AT50\%} - \lambda_{RT50\%}$ is met, and
 given that a cut-off wavelength that provides the transmittance of 50% of the infrared cut filter, when the incident angle is 0°, is $\lambda_{T50\%}$ nm and that the shift amount in the cut-off wavelength $\lambda_{T50\%}$ obtained when the incident angle on the infrared cut filter changes from 0° to 35° is denoted by $\Delta\lambda_{T50\%}$, $\Delta\lambda_{T50\%} < 25$ nm.

2. The infrared cut filter according to claim 1, wherein the transparent dielectric substrate is formed of glass.

3. The infrared cut filter according to claim 1, wherein the infrared reflecting layer is formed so as to reflect ultraviolet light.

4. The infrared cut filter according to claim 1, wherein a protective layer is provided on the infrared absorbing layer.

5. The infrared cut filter according to claim 4, wherein the protective layer has the function of preventing reflection of visible light.

6. The infrared cut filter according to claim 4, wherein the protective layer has the function of preventing transmittance of ultraviolet light.

7. The infrared cut filter according to claim 4, wherein a reflection prevention layer for preventing reflection of visible light is provided on the protective layer.

8. The infrared cut filter according to claim 7, wherein the reflection prevention layer has the function of preventing transmittance of ultraviolet light.

9. The infrared cut filter according to claim 1, wherein a primer layer is provided between the transparent dielectric substrate and the infrared absorbing layer.

10. The infrared cut filter according to claim 1, wherein the infrared reflecting layer is warped such that the surface opposite to the surface on the side of the transparent dielectric substrate is convex, and warping of the infrared reflecting layer is formed by controlling stress when the dielectric multilayer film is deposited on the transparent dielectric substrate.

11. An imaging apparatus comprising:
 the infrared cut filter according to claim 1; and
 an imaging device on which light transmitted by the infrared cut filter is incident, wherein
 the infrared absorbing layer is closer to the imaging device than the infrared reflecting layer is.

12. The infrared cut filter according to claim 1, wherein a minimal value of transmittance less than 15% occurs when the wavelength is 650 nm-750 nm in a spectral transmittance curve of the infrared absorbing layer, and $\lambda_{RT50}\%$ of the infrared reflecting layer is in a wavelength range 600 nm-700 nm.

13. The infrared cut filter according to claim 1, wherein a thickness of the transparent dielectric substrate is 0.1 mm-0.3 mm.

14. The infrared cut filter according to claim 11, wherein the infrared reflecting layer is warped such that the surface opposite to the surface on the side of the transparent dielectric substrate is convex, and warping of the infrared reflecting layer is formed by controlling stress when the dielectric multilayer film is deposited on the transparent dielectric substrate.

15. A method of manufacturing the infrared cut filter according to claim 13, comprising:
 preparing a transparent dielectric substrate having a thickness of 0.1 mm-0.3 mm;
 forming an infrared reflecting layer on one surface of the transparent dielectric substrate, the infrared reflecting layer having a cut-off wavelength in a wavelength band of 600 nm-700 nm, and an average spectral transmittance of 90% or greater in a wavelength band of 400 nm-600 nm;
 adding an infrared absorbing pigment selected from a cyanine compound, a diimonium compound, a phthalocyanine compound, or an azo compound to produce a PVB resin solution containing the infrared absorbing pigment; and
 applying the PVB resin solution on a transparent glass substrate using a flow coating apparatus and drying the transparent glass substrate.

* * * * *